United States Patent
Scherbaum

(10) Patent No.: US 10,819,222 B2
(45) Date of Patent: Oct. 27, 2020

(54) CIRCUITRY FOR POWER FACTOR CORRECTION AND METHODS OF OPERATION

(71) Applicant: Infineon Technologies Austria AG, Villach (AT)

(72) Inventor: Markus Scherbaum, Gennach (DE)

(73) Assignee: Infineon Technologies Austria AG, Villach (AT)

( * ) Notice: Subject to any disclaimer, the term of this patent is extended or adjusted under 35 U.S.C. 154(b) by 375 days.

(21) Appl. No.: 15/283,786

(22) Filed: Oct. 3, 2016

(65) Prior Publication Data
US 2017/0098993 A1   Apr. 6, 2017

(30) Foreign Application Priority Data
Oct. 6, 2015  (DE) .......................... 10 2015 116 995

(51) Int. Cl.
*H02M 1/42* (2007.01)
*H02M 3/335* (2006.01)

(52) U.S. Cl.
CPC ........... *H02M 1/42* (2013.01); *H02M 1/4241* (2013.01); *H02M 1/4258* (2013.01); *H02M 3/33546* (2013.01)

(58) Field of Classification Search
CPC ...... H02M 3/335; H02M 1/44; H02M 3/3353; H02M 1/42; H02M 7/00
See application file for complete search history.

(56) References Cited

U.S. PATENT DOCUMENTS

| 9,931,951 B2* | 4/2018 | Khaligh | B60L 11/1812 |
| 2006/0208711 A1* | 9/2006 | Soldano | H02M 1/4225 323/225 |
| 2012/0044728 A1* | 2/2012 | Yatsu | H02M 7/219 363/126 |
| 2012/0120697 A1* | 5/2012 | Cuk | H02M 1/4216 363/126 |
| 2012/0320648 A1* | 12/2012 | Harrison | H02M 1/4216 363/126 |
| 2013/0016545 A1* | 1/2013 | Xu | H02M 1/44 363/126 |

(Continued)

FOREIGN PATENT DOCUMENTS

EP    2 209 180 A1    7/2010

OTHER PUBLICATIONS

Simon Nigsch, Slobodan Cuk, Kurt Schenk, "Analysis, Modeling and Design of a True Bridgeless Single Stage PFC with Galvanic Isolation", 2015 IEE Applied Power Electronics Conference and Exposition (APEC), 2015, pp. 8.

(Continued)

*Primary Examiner* — Nguyen Tran
(74) *Attorney, Agent, or Firm* — Armis IP Law, LLC

(57) ABSTRACT

A circuit is proposed comprising (i) a first switching path comprising at least one electronic switch, wherein the first switching path can turn off in both directions and can turn on in both directions, and (ii) a second switching path comprising two electronic switches and at least one capacitance, wherein one diode path per electronic switch is embodied in parallel with the electronic switch or in series with the electronic switch. Additionally, a method for operating such a circuit is specified.

50 Claims, 16 Drawing Sheets

(56) References Cited

U.S. PATENT DOCUMENTS

| | | | | |
|---|---|---|---|---|
| 2014/0321181 A1* | 10/2014 | Chen | ............... | H02M 7/487 |
| | | | | 363/132 |
| 2015/0124492 A1* | 5/2015 | Fu | ............... | H02M 3/33546 |
| | | | | 363/21.02 |
| 2015/0263605 A1* | 9/2015 | Alam | ............ | H02M 1/4241 |
| | | | | 363/21.02 |
| 2016/0134185 A1* | 5/2016 | Wang | ............... | H02M 1/42 |
| | | | | 323/235 |

OTHER PUBLICATIONS

Daniel Hofmann, "Wie rückwärtssperrende IGBTs Energie sparen", Fachzeitschrift Elektronik Praxis, Apr. 24, 2013, pp. 2.

Sanjaya Maniktala, "Understanding and using LLC Converters to Great Advantage", Firmenschrift Microsemi CA 92656 USA, Mar. 2013, pp. 34.

German Office Action, Deutsches Patent-und Markenamt, I31429DE, dated Sep. 30, 2016, pp. 6.

* cited by examiner

FIG 17
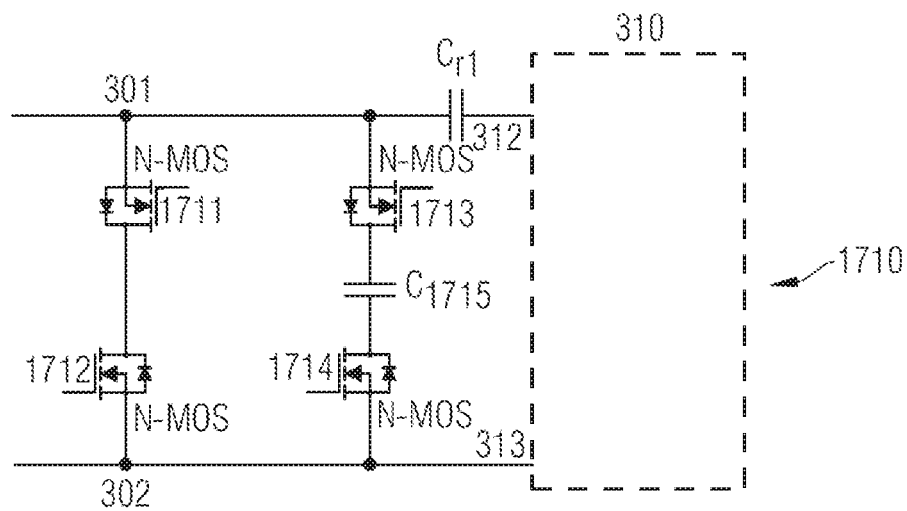
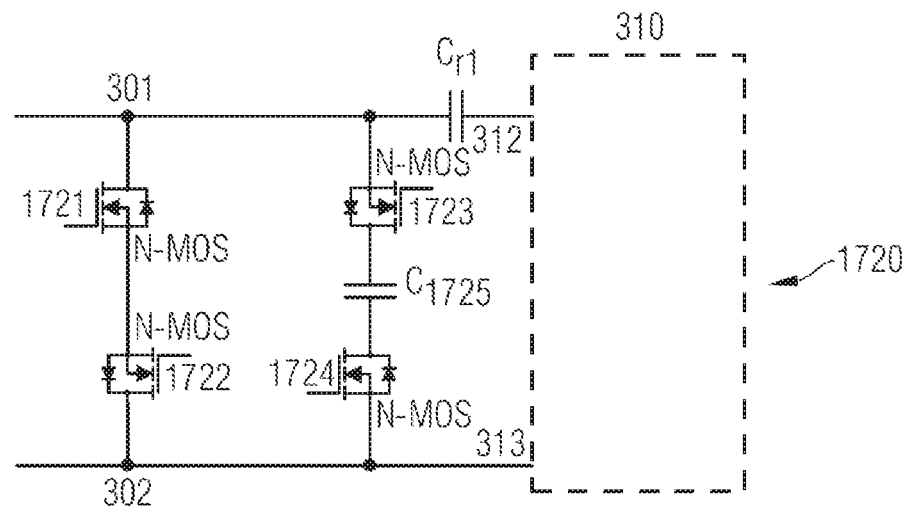
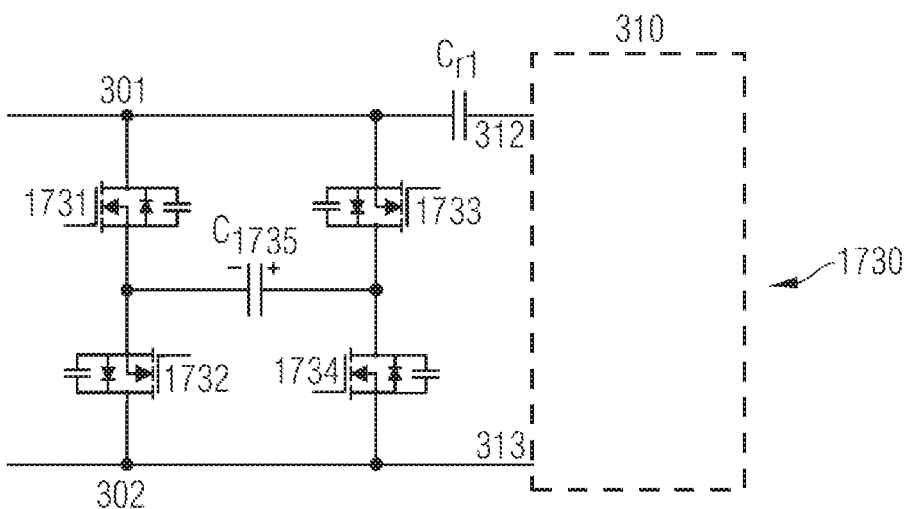

CIRCUITRY FOR POWER FACTOR CORRECTION AND METHODS OF OPERATION

RELATED APPLICATIONS

This application is related to and claims priority to German filed Patent Application Number DE 10 2015 116 995.9, entitled "SWITCHED-MODE CONVERTER WITH SIGNAL TRANSMISSION FROM SECONDARY SIDE TO PRIMARY SIDE," filed on Oct. 6, 2015.

BACKGROUND

Example circuits for a semi-resonant power factor correction circuit are known from [Slobodan Cuk, "True Bridgeless PFC Converter Achieves Over 98% Efficiency, 0.999 Power Factor", Power Electronics Technology, July 2010] and U.S. Pat. No. 4,559,590.

BRIEF DESCRIPTION

Embodiments herein include implementing novel and improved power factor correction (PFC) and corresponding circuit. Preferred embodiments are evident particularly from the dependent claims.

In one embodiment, a circuit comprises:
a first switching path comprising at least one electronic switch, wherein the first switching path can turn off in both directions and can turn on in both directions,
a second switching path comprising two electronic switches and at least one capacitance, wherein one diode path per electronic switch is embodied in parallel with the electronic switch or in series with the electronic switch.

An advantage in this case is that unnecessarily high switching losses when the semiconductor switches are switched can be avoided. By way of example, a low inductance commutation path can be provided at each operating point. This advantageously avoids undesirable overvoltages on the electronic switches. It is also possible to achieve what is known as zero voltage switching (ZVS) for the electronic switches involved.

Additionally, efficient first-time switch-on is possible even with DC isolated converters (with transformers) without additional components for precharging and without increased component burden.

By way of example, the approach presented here has the advantage that a main switch current can commutate into an additional current path comprising a capacitance and a diode. An actively controlled semiconductor switch is used to discharge the capacitance again. A body diode (inherent diode) of a MOSFET (Metal Oxide Semiconductor Field Effect Transistor) semiconductor switch can be used to save an external diode. Operation on an AC voltage means that this capacitance MOSFET network can be designed symmetrically.

In one embodiment, the electronic switches of the second switching path are two parallel-connected electronic switches, each diode path being connected in series with each switch.

In accordance with another embodiment, the two electronic switches of the second switching path are RB-IGBTs.

In accordance with further embodiments, the RB-IGBT (Reverse Blocking Insulated-Gate Bipolar Transistor) can be embodied as a discrete component or can comprise multiple discrete components, e.g. an IGBT and a diode. The function of such an RB-IGBT can be provided by means of different components; examples include MOSFETs having an additional series-connected diode.

In accordance with yet additional embodiments, the electronic switches of the second switching path has two parallel-connected RB-IGBTs, the RB-IGBTs being oriented in parallel with one another in opposite directions.

in one embodiment, the electronic switches of the second switching path are two series-connected electronic switches, each diode path being connected in parallel with each switch.

In accordance with further embodiments, the two electronic switches of the second switching path are two MOSFETs oriented in series with one another in opposite directions.

In one embodiment, the second switching path comprises at least one capacitance, at least two diode paths and at least two electronic switches, the capacitance being able to be charged via a current path having one of the diode paths, and the capacitance being able to be discharged via one of the electronic switches, in each case under bidirectional control.

In accordance with further embodiments, the diode path comprises a discrete diode or a diode that is arranged in the electronic switch (e.g. what is known as an inverse diode or body diode or inherent diode in a respective field effect transistor).

Hence, the first switching path and the second switching path may be set up to be able to perform a bidirectional switching function. This can be achieved e.g. by means of a bidirectional switching element, e.g. by two electronic switches (e.g. MOSFETs) connected in series in opposite directions or by two RB-IGBTs ("reverse blocking" IGBTs) connected in parallel in opposite directions. The respective switching path can both turn off in both directions and turn on in both directions.

In yet further embodiments, the first switching path comprises two n-channel MOSFETs that are connected in series and whose drain connections are interconnected.

In one embodiment, the first switching path comprises two n-channel MOSFETs that are connected in series and whose source connections are interconnected.

In accordance with further embodiments,
the second switching path comprises a series circuit comprising a first n-channel MOSFET, the capacitance and a second n-channel MOSFET, the capacitance being arranged between the drain connections of the first and second n-channel MOSFETs,
wherein the second switching path is arranged in parallel with the first switching path.

In accordance with still further embodiments,
the first switching path has a series circuit comprising two electronic switches,
the electronic switches of the second switching path are connected in series,
wherein a first center tap for the electronic switches of the first switching path is connected to a second center tap for the electronic switches of the second switching path.

In one embodiment,
the second switching path comprises a first capacitance that is connected in series with a first p-channel MOSFET,
wherein the source connection of the first p-channel MOSFET is connected to the second center tap and to the source connection of a second p-channel MOSFET,
wherein the drain connection of the second p-channel MOSFET is connected to a second capacitance.

In accordance with another embodiment,
the first switching path has a series circuit comprising two electronic switches,
the electronic switches of the second switching path are connected in series,
the capacitance of the second switching path is arranged between a first center tap for the electronic switches of the first switching path and a second center tap for the electronic switches of the second switching path.

In yet further embodiments,
the second switching path comprises a series circuit comprising a first n-channel MOSFET and a second n-channel MOSFET, which have their drain connections connected to the second center tap,
wherein the capacitance of the second switching path is arranged between the second center tap of the second switching path and the first center tap of the first switching path.

In one embodiment, the electronic switches of the second switching path are connected in series with the at least one capacitance.

In accordance with further embodiments, the first switching path has two electronic switches connected in series in opposite directions that are connected in series.

In yet further embodiments, the first switching path has two RB-IGBTs connected in parallel in opposite directions.

In particular, the first switching path can have MOSFETs and the second switching path can have RB-IGBTs, or vice-versa. It is thus possible for electronic switches to be provided in each case that are able to turn off and turn on in both directions.

In one embodiment, the circuit additionally comprises:
an input inductance that is arranged between an input of the circuit and the first switching path,
a resonant circuit comprising a resonant inductance and a resonant capacitance, the resonant circuit being arranged between the first switching path and an output of the circuit,
wherein the first switching path and the second switching path are connected in parallel with one another.

In accordance with another embodiment, the resonant capacitance has a first capacitor and a second capacitor,
wherein the first capacitor is connected to the resonant inductance in series with a primary side of a transformer, and
wherein the second capacitor is connected to a secondary side of the transformer.

In still further embodiments,
the resonant capacitance is connected to a load via a second diode, the cathode of the second diode pointing in the direction of the load, and
a first diode is provided whose cathode is connected to the anode of the second diode and whose anode is connected to ground.

In yet further embodiments,
the resonant capacitance is connected to a load via a further second electronic switch, and
a further first electronic switch is provided, on the basis of which a current path is switchable between a node and ground, the node being arranged between the resonant capacitance and the second switch.

The further (first and second) electronic switches, which may each be embodied particularly as a MOSFET (e.g. n-channel MOSFET), can be used to implement feedback operation from a secondary side of a transformer to the primary side thereof and further in the direction of an AC grid. In this case, a phase shift can be used to adjust the amount of energy fed back.

In one embodiment, a switching frequency at which at least one of the electronic switches of the first switching path is actuated is higher than a resonant frequency of the resonant circuit.

In one embodiment, the second switching path comprises a commutation circuit, wherein the commutation circuit is set up such that
after one of the electronic switches of the first switching path is switched off, a current flows via a diode path of one of the electronic switches and the capacitance of the second switching path.

In one embodiment, at least one of the electronic switches of the first switching path and/or the switching element of the second switching path is actuated such that zero voltage switching is effected.

In one embodiment, the respective electronic switch is a semiconductor switch.

In one embodiment, development is that the respective electronic switch is actuated by a closed-loop control circuit.

In one embodiment, the circuit is a circuit for power factor correction.

The above embodiments are by proposing a method for operating a circuit comprising
a first switching path comprising at least one electronic switch, wherein the first switching path can turn off in both directions and can turn on in both directions,
a second switching path comprising two electronic switches and at least one capacitance, wherein one diode path per electronic switch is embodied in parallel with the electronic switch or in series with the electronic switch,
a closed-loop control circuit that actuates the electronic switches of the first switching path and the electronic switches of the second switching path such that after one of the electronic switches of the first switching path is switched off, a current flows via a diode path of one of the electronic switches of the second switching path and the capacitance of the second switching path.

In this case, the diode path may be a fixed component of the respective electronic switch or may be embodied separately therefrom.

In one embodiment, during a switched-off period for one of the electronic switches of the first switching path, the capacitance of the second switching path is discharged via an electronic switch of the second switching path.

Hence, the closed-loop control circuit allows the capacitance of the second switching path to be discharged through an electronic switch of the second switching path during a switched-off period for one of the electronic switches of the first switching path.

In accordance with another embodiment,
the circuit additionally comprises
an input inductance that is arranged between an input of the circuit and the first switching path,
a resonant circuit comprising a resonant inductance and a resonant capacitance, the resonant circuit being arranged between the first switching path and an output of the circuit,
wherein the first switching path and the second switching path are connected in parallel with one another,
the closed-loop control circuit is set up such that a switching frequency at which at least one of the electronic switches of the first switching path is actuated is higher than a resonant frequency of the resonant circuit.

In yet further embodiments, the explanations relating to the apparatus and circuit described here apply to the method and further claim categories as appropriate.

The properties, features and advantages of embodiments herein are described above and also the way in which they are achieved will become clearer and more distinctly comprehensible in connection with the schematic description that follows for exemplary embodiments that are explained in more detail in conjunction with the drawings. In this case, elements that are the same or that have the same effect may be provided with the same reference symbols for the sake of clarity.

These and other more specific embodiments are disclosed in more detail below.

Note further that embodiments herein can include computer processor hardware (that executes corresponding switch instructions) to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, ...) including computer program logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling phases in a power supply.

For example, in one embodiment, the instructions, when carried out by a computer processor hardware, causes the computer processor hardware to:

The ordering of the steps has been added for clarity sake. These steps can be performed in any suitable order.

It is to be understood that the system, method, device, apparatus, etc., as discussed herein can be embodied strictly as hardware, as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of embodiments herein will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 17 shows an example of three variants for the embodiment of the first switching path and of the second switching path according to embodiments herein;

DETAILED DESCRIPTION

Figure 1:
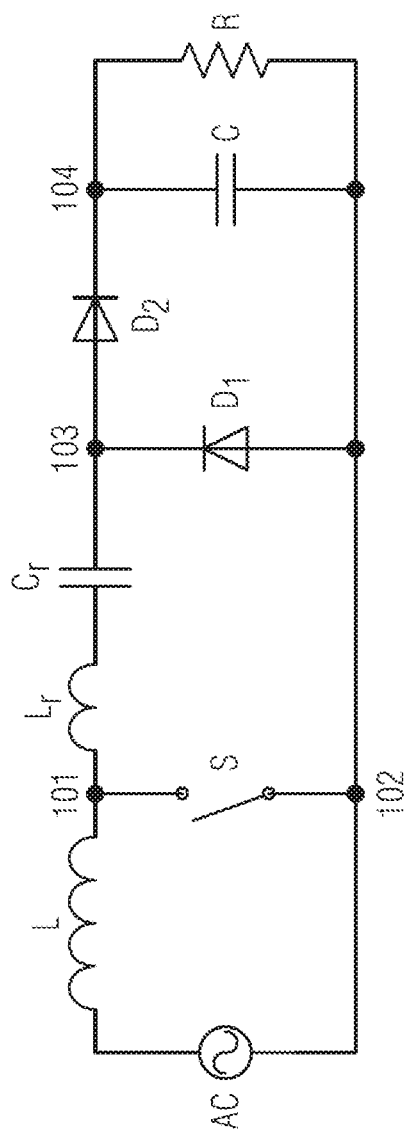
FIG. 1 shows a circuit for an unisolated, semi-resonant power factor correction stage without an input rectifier according to embodiments herein.

FIG. 1 shows a circuit for an unisolated, semi-resonant power factor correction stage without an input rectifier.

An AC power source AC has one connection connected via an inductance L to a node 101, the other connection of the AC power source AC being connected to a node 102. The node 101 and the node 102 have a switch S arranged between them. The node 101 is connected to a node 103 via a series circuit comprising an inductance $L_r$ and a capacitance $C_r$. The node 103 is connected to the node 102 via a diode D1, the cathode of the diode D1 pointing in the direction of the node 103. The node 103 is connected to a node 104 via a diode D2, the cathode of the diode D2 pointing in the direction of the node 104. A capacitance C is arranged between the nodes 104 and 102. Arranged in parallel with the capacitance C is a load (in this case shown as a resistor R).

It should be noted that the "capacitances" mentioned herein can each be implemented using at least one capacitor. Correspondingly, the "inductances" can each comprise at least one coil.

Figure 2:
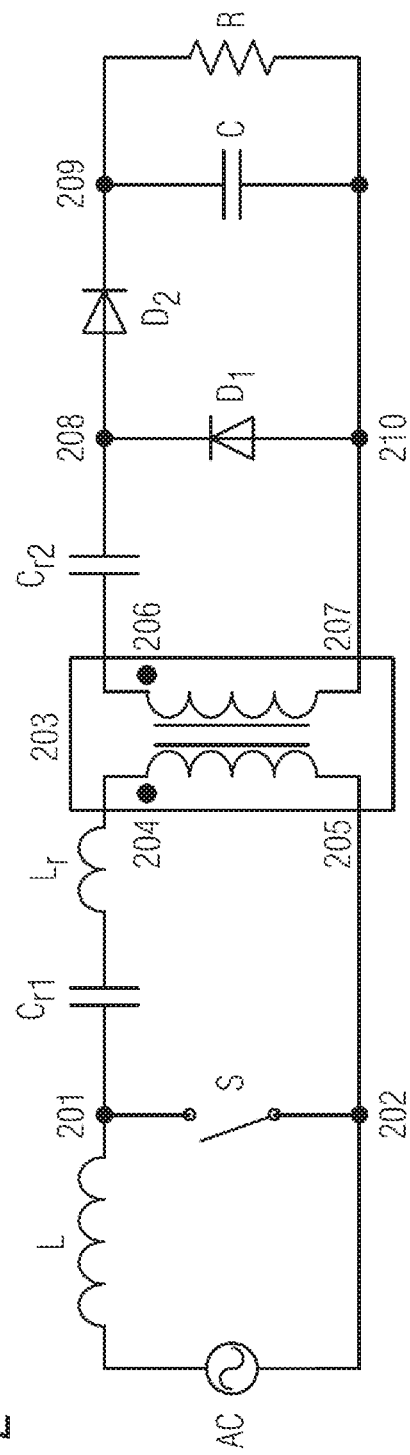
FIG. 2 shows a circuit for an isolated semi-resonant power factor correction stage without an input rectifier according to embodiments herein.

FIG. 2 shows a circuit for an isolated semi-resonant power factor correction stage without an input rectifier according to embodiments herein.

The isolation is achieved in FIG. 2 by means of a transformer 203 that has a primary with two connections 204 and 205 and also a secondary with two connections 206 and 207.

An AC power source AC has one connection connected via an inductance L to a node 201, the other connection of the AC power source AC being connected to a node 202. The node 201 and the node 202 have a switch S arranged between them.

The node 201 is connected to the connection 204 of the primary via a series circuit comprising a capacitance $C_{r1}$ and an inductance $L_r$. The node 202 is connected to the connection 205 of the primary.

The connection 206 of the secondary is connected to a node 208 via a capacitance $C_{r2}$. The connection 207 of the secondary is connected to a node 210. The node 208 is connected to the node 210 via a diode D1, the cathode of the diode D1 pointing in the direction of the node 208. The node 208 is connected to a node 209 via a diode D2, the cathode of the diode D2 pointing in the direction of the node 209. A capacitance C is arranged between the nodes 209 and 210. Arranged in parallel with the capacitance C is a load (in this case shown as a resistor R).

The switch S may be implemented by means of at least one semiconductor switch, e.g. a MOSFET.

The switch S may be designed to be off in both directions. This can be achieved by virtue of the switch S being implemented by two MOSFETs connected in series in opposite directions or two reverse blocking IGBTs (RBIG-BTs) that are in parallel in opposite directions. The inductance $L_r$ in FIG. 2 can be implemented by means of a leakage inductance of the transformer 203.

The circuits shown in FIG. 1 and FIG. 2 (also referred to as converters) each comprise a resonant circuit portion having the resonant inductance $L_r$ and the resonant capacitance $C_r$ (or a series circuit comprising the capacitances $C_{r1}$ and $C_{r2}$), which form a resonant circuit with a charge reversal process during the switched-on time of the switch S. The resonant inductance $L_r$ is distinctly smaller than the input inductance L. This resonant circuit or the resonant inductance $L_r$ poses problems during the switch-off instant of the switch S. Additionally, switching on the circuits after capacitance C has previously been (almost) completely discharged is problematic.

It is thus first of all a problem that, at the switch-off instant of the semiconductor switch S, the current commutates from the switch branch to the resonant branch, that is to say in the direction of the series circuit comprising inductance $L_r$ and capacitance $C_r$ in the case of FIG. 1. The resonant branch cannot adopt the current immediately, however, on account of the resonant inductance $L_r$ arranged therein. A large positive current change $di_r/dt$ in the resonant circuit causes a high voltage across the inductance $L_r$ that loads the switch S, in addition to the output voltage $U_{out}$ dropped across the load R, by virtue of the resultant overvoltage briefly exceeding the admissible dielectric strength of the switch S.

A further problem arises if the switched-on time of the semiconductor switch S is shorter than the time required for a complete resonant charge reversal process, and thus the resonant branch current has not decreased to zero during the switched-on time: thus, if the switch S is switched off at the end of the switched-on time, there is no suitable freewheeling path available for the resonant current from the inductance $L_r$. This results in a large negative current change $di_r/dt$, which in turn produces an overvoltage on the switch S.

In order to protect the semiconductor switch S against damage in the event of the overvoltages, the overvoltage is preferably limited to an admissible value.

A further problem is possible damage to the inductance $L_r$: if the semiconductor switch S is operated in clocked fashion (that is to say switched on and off with a prescribed clock pulse) with capacitance C discharged, that is to say at an output voltage $U_{out}=0V$, then the instantaneous input voltage is applied across the capacitance $C_r$ on average. This (high) voltage across the capacitance $C_r$ is connected in series with the resonant inductance $L_r$ when the semiconductor switch S is switched on. The result is a very high resonant charge reversal current both at positive and at negative input voltage. This charge reversal current exceeds the rated current by a multiple (e.g. around ten times). This can lead to magnetic saturation of the inductance $L_r$ and to damage to all components involved in the flow of current.

To avoid the overvoltage on components that are sensitive thereto, in this case the switch S and the inductance $L_r$, Z diodes are used. This allows the overvoltage to be limited (also: "clamped"). A disadvantage in this case is that this type of overvoltage limiting is subject to high losses. Thus, the energy stored in the inductance $L_r$ is converted into heat in the Z diodes, which additionally requires appropriate dimensioning of the Z diodes and has a disadvantageous effect on the lives thereof. Often, the heat loss required also means that a correspondingly large volume for the circuit is necessary or cooling (active or passive) is additionally needed.

The solution described herein is much more energy-efficient and additionally allows unnecessarily high switching losses to be avoided during switching of the semiconductor switches.

By way of example, a low-inductance commutation path can be provided at each operating point. This advantageously avoids undesirable overvoltages on the switch. It is also possible for what is known as zero voltage switching (ZVS) in the MOSFET switches involved to be achieved.

Additionally, efficient first-time switch-on is also possible in the case of DC isolated converters (cf. e.g. FIG. 2) without additional components for preliminary charging and without increased component loading.

By way of example, the approach presented here has the advantage that a main switch current can commutate into an additional current path comprising a capacitance and a diode. An actively controlled semiconductor switch is used to discharge the capacitance again. A body diode of a MOSFET semiconductor switch can be used to save an external diode. Operation on an AC voltage means that this capacitance MOSFET network can be designed symmetrically.

Figure 3:
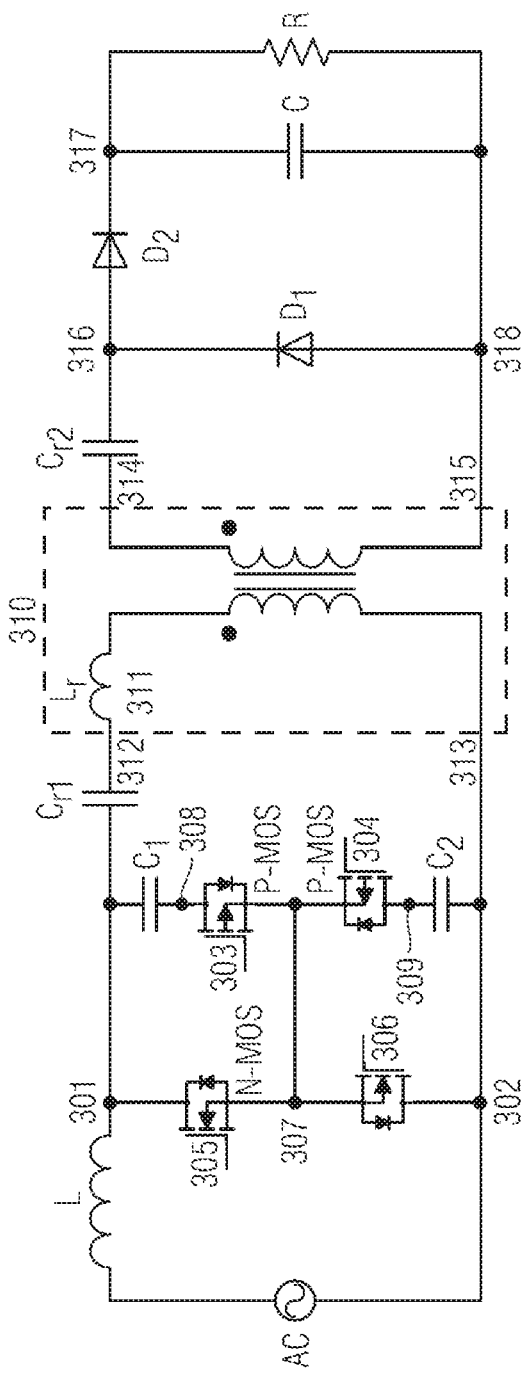
FIG. 3 shows an exemplary circuit arrangement having two capacitances and p-channel MOSFET devices, wherein the p-channel MOSFET devices have a common source potential with the n-channel MOSFET devices provided in a main channel according to embodiments herein.

FIG. 3 shows an exemplary circuit arrangement having two capacitances and p-channel MOSFETS, wherein the p-channel MOSFETs have a common source potential with the n-channel MOSFETs provided in a main channel.

An AC power source AC has one connection connected via an inductance L to a node 301, the other connection of the AC power source AC being connected to a node 302.

The node 301 and the node 302 have a series circuit comprising an n-channel MOSFET 305 and an n-channel MOSFET 306 arranged between them, the drain connection of the MOSFET 305 being connected to the node 301, the source connection of the MOSFET 305 being connected to a node 307, the source connection of the MOSFET 306 being connected to the node 307 and the drain connection of the MOSFET 306 being connected to the node 302.

Additionally, the node 301 is connected to a node 308 via a capacitance $C_1$. The node 308 is connected to a node 309 via a series circuit comprising a p-channel MOSFET 303 and a p-channel MOSFET 304. The node 309 is connected to the node 302 via a capacitance $C_2$. The drain connection of the MOSFET 303 is connected to the node 308 and the source connection of the MOSFET 303 is connected to the node 307. The source connection of the MOSFET 304 is connected to the node 307 and the drain connection of the MOSFET 304 is connected to the node 309.

Additionally, FIG. 3 shows a transformer 310 having a connection 312 that is connected to a primary via a leakage inductance 311 ($L_r$), the opposite connection of the primary being connected to a connection 313 of the transformer 310. The transformer 310 also has a secondary having two connections 314 and 315.

The node 301 is connected to the connection 312 via a capacitance $C_{r1}$ (resonant capacitance).

The connection 314 of the secondary is connected to a node 316 via a capacitance $C_{r2}$. The connection 315 of the secondary is connected to a node 318. The node 318 is connected to the node 316 via a diode D1, the cathode of the diode D1 pointing in the direction of the node 316. The node 316 is connected to a node 317 via a diode D2, the cathode of the diode D2 pointing in the direction of the node 317. A capacitance C is arranged between the nodes 317 and 318. Arranged in parallel with the capacitance C is a load (in this case shown as a resistor R).

The gate connections of the MOSFETs 305 and 306 and the gate connections of the MOSFETs 303 and 304 are actuated by a control unit, for example.

Figure 4:
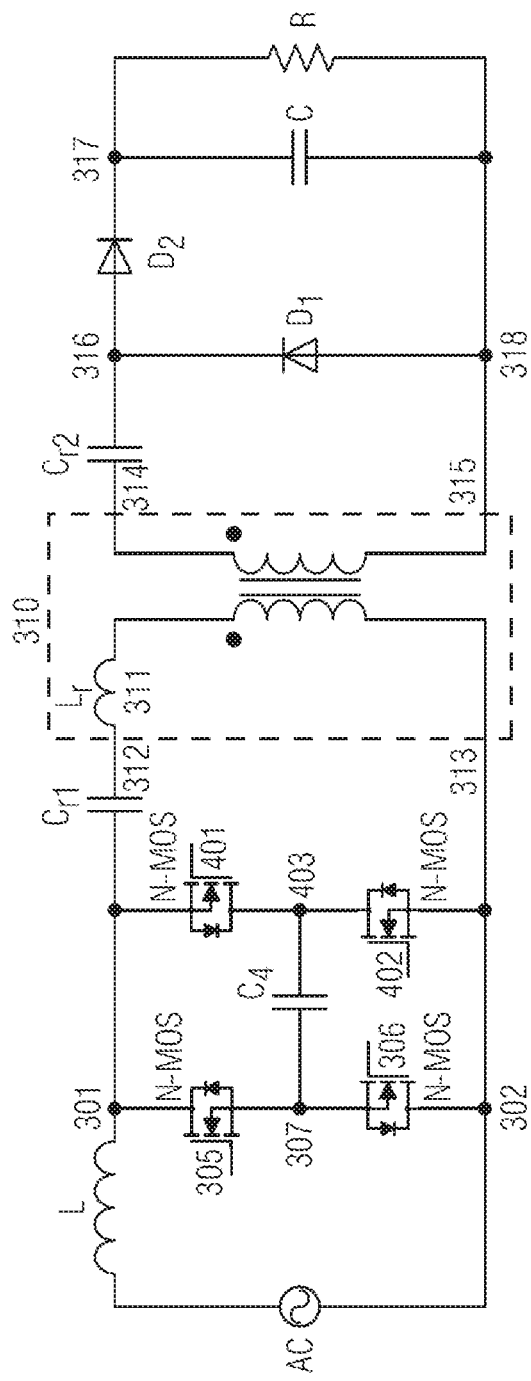
FIG. 4 shows an alternative embodiment based on FIG. 3, in which the capacitances and the p-channel MOSFET devices have been replaced by n-channel MOSFET devices and a capacitance between center taps of the switching paths according to embodiments herein.

FIG. 4 shows an alternative embodiment, in which the capacitance $C_1$ and the p-channel MOSFET 303 have been replaced by an n-channel MOSFET 401 and the capacitance $C_2$ and the p-channel MOSFET 304 have been replaced by an n-channel MOSFET 402.

The source connection of the MOSFET 401 is connected to the node 301 and the drain connection of the MOSFET 401 is connected to a node 403. The source connection of the MOSFET 402 is connected to the node 302 and the drain connection of the MOSFET 402 is connected to the node 403. The node 403 is connected to the node 307 via a capacitance $C_4$.

An advantage in this case is that FIG. 4 uses n-channel MOSFETs throughout, which have a lower on-state resistance than p-channel MOSFETs. A further advantage is that instead of the two capacitances $C_1$ and $C_2$, only one capacitance $C_4$ is now needed. It is also advantageous that the source connections of the n-channel MOSFETs 401 and 402 are each at the drain potential of the MOSFETs 305 and 306, and hence a conventional half-bridge driver with, by way of example, a bootstrap power supply for high-side gate drivers can be used.

In order to achieve zero voltage switching (ZVS) for the MOSFETs, a higher value for the resonant inductance $L_r$ is advantageous. This inductance can be integrated into the transformer 310 by means of a defined leakage. The capacitances $C_{r1}$ and $C_{r2}$ can remain unaltered for a (largely) constant voltage ripple. Hence, the solution proposed here allows the resonant frequency $f_r$ of the $L_r$–$C_r$ network to be lower than the switching frequency $f_{SW}$ of the converter ($f_r < f_{SW}$).

The circuits shown in FIGS. 3 and 4 can also be implemented, as a variant, without potential isolation by virtue of the transformer 310 being omitted. The resonant inductance $L_r$ is then implemented as a discrete component, the two capacitances $C_{r1}$ and $C_{r2}$ being able to be combined into one capacitance.

MOSFET Actuation Scheme and Operation

The explanations below pertaining to the actuation scheme relate by way of example to the four n-channel MOSFETs 305, 306, 401 and 402 shown in FIG. 4. The circuit shown in FIG. 4 corresponds to an isolated PFC (power factor correction) stage having a primary-side H bridge without a rectifier, for example.

Figure 5:
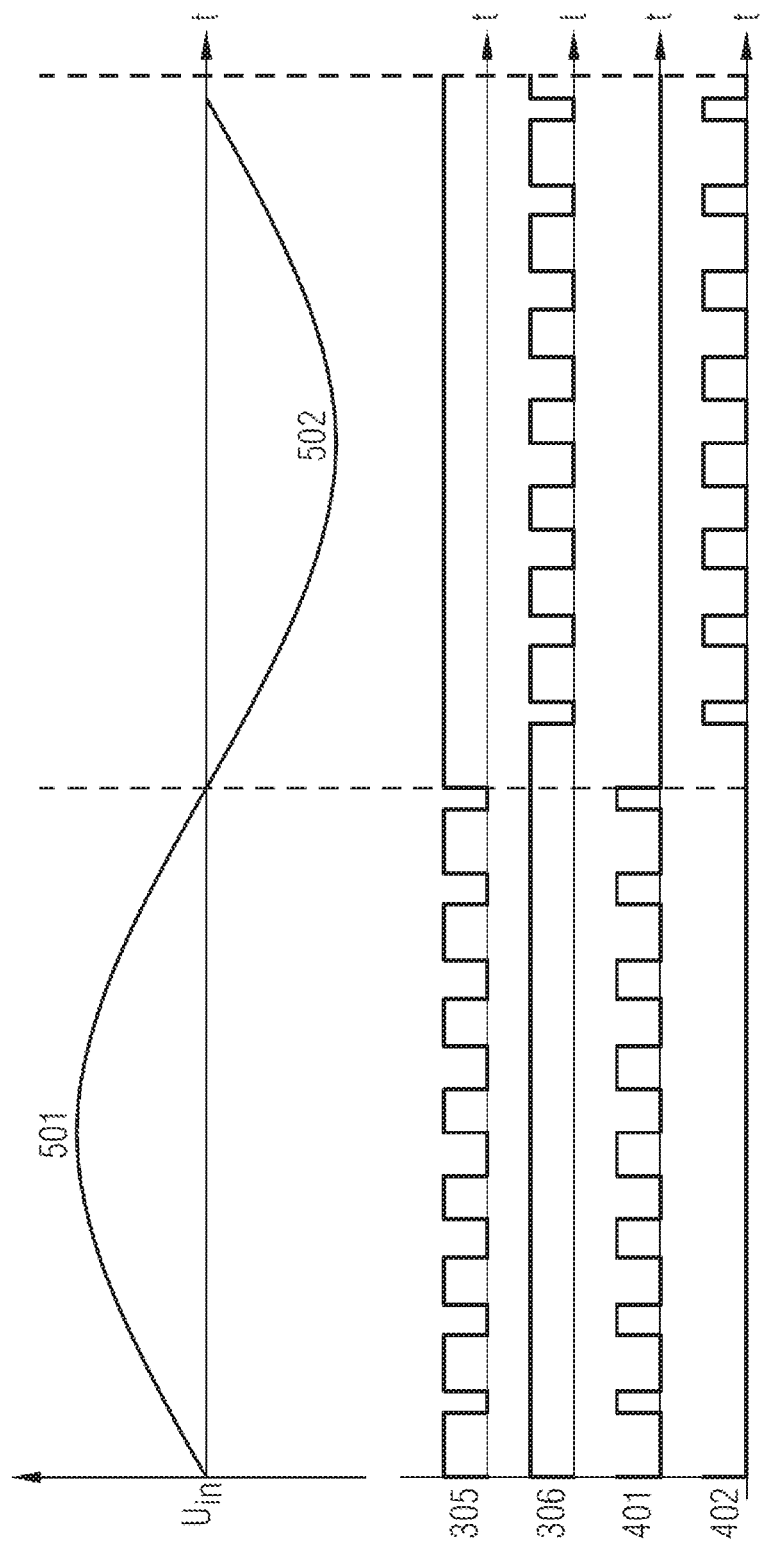
FIG. 5 shows actuating signals for the MOSFET devices on the basis of a voltage profile (input voltage) on the AC voltage source AC according to embodiments herein.

FIG. 5 shows actuating signals for the MOSFETs 305, 306, 401 and 402 on the basis of a voltage profile $U_{in}$ (input voltage) on the AC power source AC (e.g. in the form of a grid voltage). The actuating signals are applied to the respective gate connections of the MOSFETs. The voltage profile $U_{in}$ has a positive half-cycle 501 and a negative half-cycle 502.

During the positive half-cycle 501, the MOSFET 306 is permanently on, the associated MOSFET 402 remaining permanently off during this time. A pulse/pause ratio of the actuating signal on the gate connection of the MOSFET 305 forms the profile of an inductor current for the inductance L and, for an efficient (ideally an optimum) power factor λ≈1, is supposed to follow the input voltage form. The MOSFET 401 switches with a short dead time in complementary fashion to the MOSFET 305.

During the negative half-cycle 502, the rolls are interchanged and the MOSFET 305 remains on and the MOSFET 401 remains off. The pulse-width-modulated signal (PWM signal) on the gate connection of the MOSFET 306 then models the grid current draw and the associated MOSFET 402 switches (with a short dead time) in complementary fashion to the MOSFET 306.

The text below takes the illustration of FIG. 4 as the basis for providing an exemplary description of an operating variant for the circuit for power factor correction. The topology of the circuit shown in FIG. 4 corresponds to an isolated, input-rectifier-less, semi-resonant, zero-voltage-switching single-stage AC/DC converter with a power factor correction. Multiple output voltages are possible.

Multiple switching and current-flow states can be distinguished depending on the input voltage polarity of the signal provided by the AC power source AC.

For the purpose of simplified illustration of the states, it is assumed that the main inductance of the transformer 310 is very large and therefore a magnetization current is negligible for the present consideration. Additionally, it is assumed that the input inductance L is very large, which means that the input current ripple in the signal provided by the AC power source AC can be ignored.

The individual states are explained below with reference to FIG. 4 (the MOSFETs 305, 306, 401 and 402 are subsequently referred to as switches). By way of example, the states are described for positive input voltage polarity in this case, the switch 306 being permanently on and the switch 402 being permanently off:

State 1: The switch 305 is closed, the input voltage is applied across the inductance L and a corresponding magnetization current flows via the path: AC power source AC, inductance L, switch 305 and switch 306. At the same time, a resonant, sinusoidal current (corresponding to a detail from a sine curve) flows in the circuit through the switch 305, the switch 306, the capacitance $C_{r1}$, the inductance $L_r$, the capacitance $C_{r2}$ via the diode $D_2$ into the capacitance C (which serves as a buffer in this case) or the load R. These two currents are superimposed in the switch 305. In state 1, the absolute value of the resonant current is greater than the input current through the inductance L.

State 2: State 2 is similar to state 1, only in this case the resonant current has already fallen to the extent that the inductor current through the inductance L is larger in terms of absolute value. The direction of current flow through the switch 305 has therefore turned around (that is to say that the current flows from the node 301 to the node 302 in state 2).

State 3: The wave of the resonant current has passed through the zero crossing and now flows in the opposite direction, i.e. from the node 302 to the node 318, through the diode $D_1$ to the node 316 via the node 301. The diode $D_2$ is off while the diode $D_1$ is on.

State 4: In state 4, the switch 305 has been switched off, and the switch 401 is likewise still off. This state represents the switching dead time for the half-bridge consisting of the switches 305 and 401. In this case, the output capacitance of the switch 305 (MOSFET with prescribed output capacitance; the output capacitance of the respective switch can be regarded as a capacitance between source and drain connections in FIG. 4) is charged to the same voltage value as is applied across the capacitance $C_4$. On the basis of Kirckhoff's voltage law, the output capacitance of the switch 401 must be discharged at the same time in this case, the body diode of the switch 401 adopting the current on complete discharge.

State 5: The switch 401 can now be switched on under zero voltage. The current through the capacitance $C_4$ is superimposed from the input inductor current through the inductance L and the resonant current (that is to say the current that flows from the resonant circuit into the node 301). Toward the end of this state 5, the resonant current falls further and approaches the zero crossing.

State 6: The resonant current has passed through the zero crossing and changed its direction (that is to say from the node 301 in the direction of the capacitance $C_r$), but its absolute value is still smaller than that of the input current (which flows from the inductance L into the node 301). The flow of current is as follows: from the node 301 via the switch 401 to the node 403 via the capacitance $C_4$ to the node 307 via the switch 306 to the node 302. The diode $D_1$ is off, the diode $D_2$ is on and the capacitance C and the load R are supplied with power again.

State 7: State 7 is similar to state 6. The resonant current is now larger than the input current. The superimposition of the two currents through the capacitance $C_4$ produces the following direction of current flow: from the node 302 through the switch 306 to the node 307 via the capacitance $C_4$ to the node 403 via the switch 401 to the node 301. As in state 6, the diode $D_1$ is off, the diode $D_2$ is on and the capacitance C and the load R are supplied with power.

State 8: The switch 401 has been switched off. This state 8 again corresponds to the dead time when the half-bridge is switched over. In this case, the resonant current that still flows charges the output capacitance of the switch 401, and at the same time, the output capacitance of the switch 305 is discharged. In the next state, the switch 305 can then be switched on under zero voltage, and a new switching cycle begins again with state 1.

The symmetrical design of the primary-side circuit portion means that the circuit behaves similarly when the polarity of the input voltage is negative to when the polarity is positive, the only difference being that the switching behavior of the switch 305 is interchanged with the switching behavior of the switch 306, and the switching behavior of the switch 401 is interchanged with the switching behavior of the switch 402. The secondary-side diodes $D_1$ and $D_2$ change their switching behavior correspondingly: thus, the diode that was off in the same state for a positive input voltage is now on, while the other diode is off.

Both a step-up converter mode and a step-down converter mode are possible, i.e. the input voltage may be lower or higher than the output voltage (given a transformation ratio of ü=1 for the transformer 310). In this case, the voltage gain is also dependent on the input current and a switch-on duty ratio of the switches 305 and 306.

The circuit shown in FIG. 4 has two different operating modes that differ by virtue of the value of the capacitance $C_4$:

In an operating mode 1, the value of the capacitance $C_4$ has the same order of magnitude as the value of the resonant capacitance $C_{r1}$, or the value of the resonant capacitance $C'_{r2}$ converted for the primary side.

In an operating mode 2, the capacitance $C_4$ is much larger (e.g. by a factor of 100 to 1000 larger in comparison with operating mode 1); in this context, the values are oriented to the output capacitance of what is known as a "bulk" capacitor of a conventional power factor correction stage (PFC stage).

The two operating modes are explained to a further extent below:

Operating Mode 1:

In this case, the value of the capacitance $C_4$ is oriented to the magnitude of the resonant capacitance $C_{r1}$, or to the value of the resonant capacitance $C'_{r2}$ converted for the primary side. The capacitance values are preferably chosen such that the following holds for the resonant frequency $f_r$ based on the switching frequency $f_{SW}$:

$$f_r = \frac{1}{2 \cdot \pi \cdot \sqrt{L_r \cdot C_{r,\mathit{eff}}}} < \frac{1}{2} \cdot f_{SW}$$

The conditions cited above for the resonant frequency $f_r$ can be extended to up to $f_r < f_{SW}$ if it is ensured that the resonant oscillation (i.e. the resonant current) does not fall to zero or change its arithmetic sign during a switching state. Half of the resonant period duration (i.e. a positive half-cycle) is preferably not supposed to be shorter than the duration of a switching state. This is advantageous particularly in the case of all possible operating points.

This correlation is also evident from the single profiles 710 and 910 shown below (see FIG. 7 and FIG. 9): the resonant sinusoidal oscillation can be seen in the current profile 710 or 910 through the diode D2. Thus, in the switching state, the current reaches the peak value and falls again, but the current is still greater than zero at the end of the switching state.

A capacitance $C_{r,\mathit{eff}}$ is obtained from the series circuit of $C_4$ and $C_{r1}$ and from the capacitance $C'_{r2}$ transformed for the primary side. The high output capacitance C can be ignored in this case:

$$\frac{1}{C_{r,\mathit{eff}}} = \frac{1}{C_1} + \frac{1}{C_{r1}} + \frac{1}{C'_{r2}}$$

The capacitance $C_{r2}$ is converted for the primary side to give $C'_{r2}$ on the basis of a transformer turn ratio ü of the transformer 310 as follows, where $N_1$ is the number of primary turns and $N_2$ is the number of secondary turns in the transformer 310:

$$ü = \frac{N_1}{N_2}$$

$$C'_{r2} = \left(\frac{N_1}{N_2}\right)^2 \cdot C_{r2} = ü^2 \cdot C_{r2}$$

Optionally, the capacitances $C_4$, $C_{r1}$ and the capacitance $C'_{r2}$ transformed for the primary side can have approximately the same values.

On account of the relatively low capacitance $C_4$, the inrush current is negligible, and inrush current limiting by means of resistors can be dispensed with. During rated operation, the voltage on the capacitance $C_4$ has a rectified sine-like form at accordingly twice the grid frequency, on which a low voltage ripple at the switching frequency is superimposed.

In this case, the amplitude of the sine fundamental is dependent on the input voltage, the input current, the output voltage and the value of the resonant inductance $L_r$.

The output DC voltage has a voltage ripple at twice the grid frequency.

Operating Mode 2:

In this case, the capacitance $C_4$ is much larger. By way of example, a guideline of approximately 0.5 μF to 1 μF per watt of rated power can be assumed. During rated operation, a constant DC voltage (with low voltage ripple at twice the grid frequency) is applied. The level of the DC voltage across the capacitance $C_4$ is at least the grid peak voltage. The precise value is dependent on the input voltage, the input current, the output voltage and the value of the resonant inductance $L_r$. It is only necessary for the output voltage to be regulated, the voltage across $C_4$ being adjusted automatically.

The comparatively large capacitance $C_4$ and the body diodes of the four MOSFETs result in a high inrush current. The advantage in this case is that the capacitance $C_4$ can take up a pulse of energy in a test for overvoltage ("surge test") and thus contributes to short-term overvoltage protection.

The output DC voltage has a voltage ripple at 4 times the grid frequency.

Graphs Pertaining to Operating Mode 1

Figure 6:
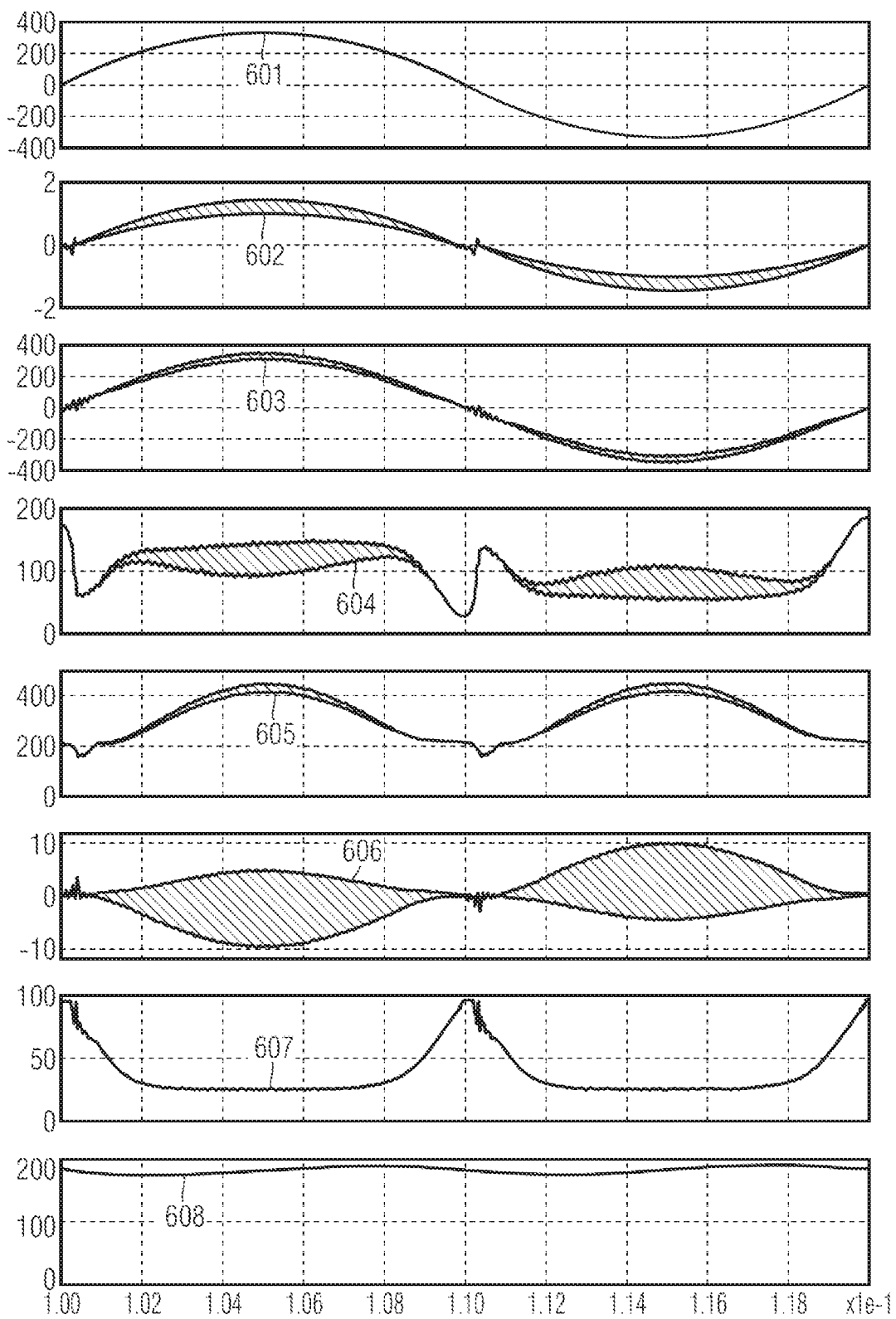
FIG. 6 shows a graph with multiple signal profiles over time (operating mode 1) according to embodiments herein.

FIG. 6 shows a graph with multiple signal profiles over time. It shows:
- a voltage profile $U_{in}$ 601 on the AC power source AC,
- a current profile $i_L$ 602 for a current through the inductance L,
- a voltage profile $U_{Cr1}$ 603 for a voltage across the capacitance $C_{r1}$,
- a voltage profile $U_{Cr2}$ 604 for a voltage across the capacitance $C_{r2}$,
- a voltage profile $U_{C4}$ 605 for a voltage across the capacitance $C_4$,
- a current profile $i_{Cr1}$ 606 for a current through the capacitance $C_{r1}$,
- a duty ratio (duty cycle) 607 for the MOSFET 305 during the positive half-cycle of the signal 601 and for the MOSFET 306 during the negative half-cycle of the signal 601,
- a voltage profile $U_{out}$ 608 for a voltage across the load R.

By way of example, FIG. 6 therefore shows operation on a 230 V grid voltage $U_{in}$ and for a power draw of 200 W. The transformation ratio ü of the transformer 310 is ü=1, and the output DC voltage $U_{out}$=200V. The resonant circuit is formed from $C_4 = C_{r1} = C_{r2} = 400$ nF and $L_r = 50$ μH.

The duty cycle 607 has a "bathtub form" with an approximately constant range in the middle of the respective valley.

Figure 7:
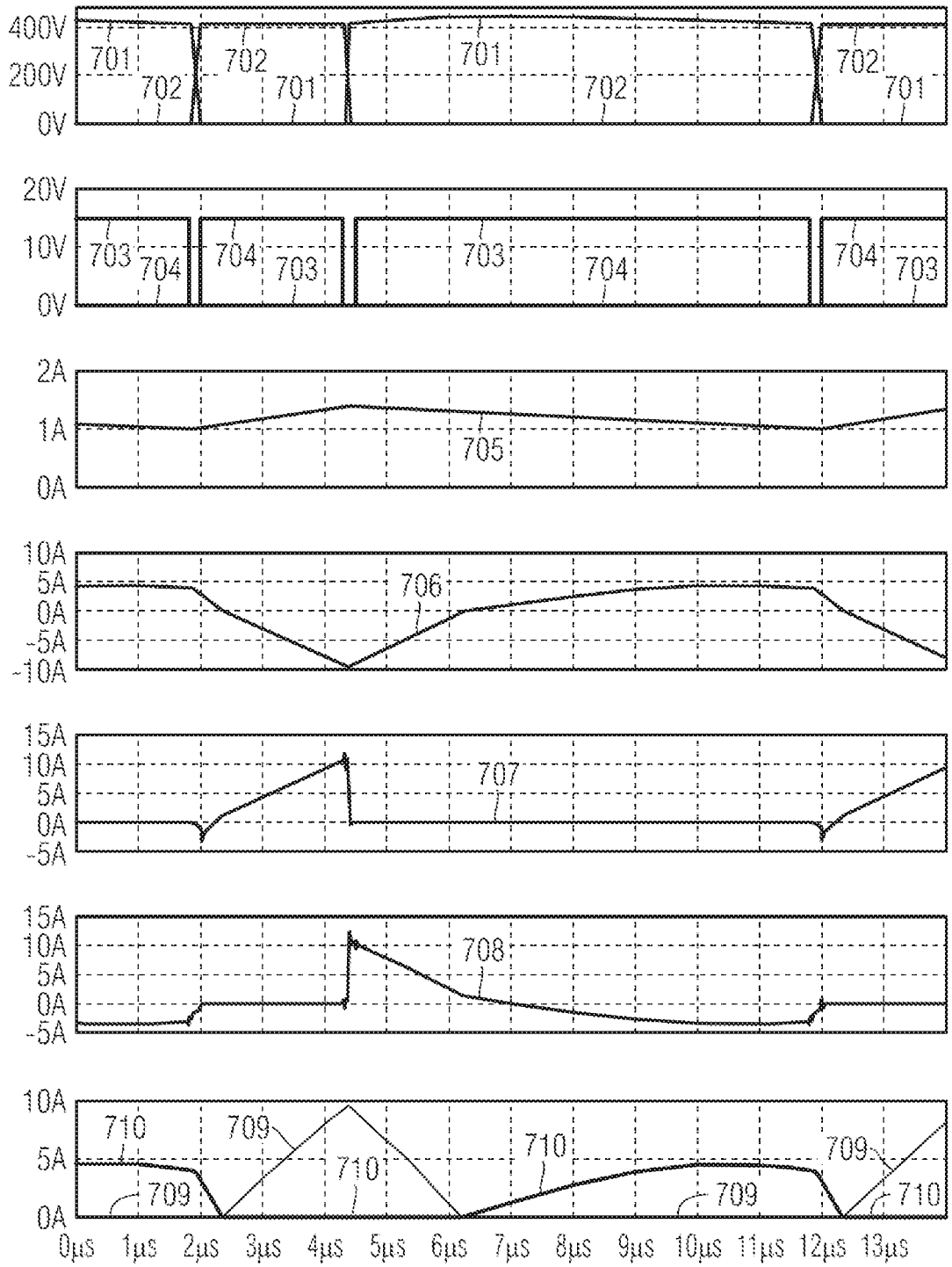
FIG. 7 shows a graph that represents a detail at the operating point around the positive peak of the grid voltage ($U_{in}$=325V, $I_{in}$=1.23 A) over a switching period in operating mode 1 according to embodiments herein.

FIG. 7 is a graph that shows a detail at the operating point around the positive peak of the grid voltage ($U_{in}$=325V, $I_{in}$=1.23 A) over a switching period in operating mode 1. In this case, FIG. 7 comprises
- a voltage profile 701 between the source connection and the drain connection of the MOSFET 305,
- a voltage profile 702 between the source connection and the drain connection of the MOSFET 401,
- a voltage profile 704 on the gate connection of the MOSFET 305,
- a voltage profile 703 on the gate connection of the MOSFET 401,
- the current profile $i_L$ 705 of a current through the inductance L,
- the current profile $i_{Cr1}$ 706 of a current through the capacitance $C_{r1}$, a current profile $i_{305}$ 707 for a current through the MOSFET 305, a current profile $i_{C4}$ 708 for a current through the capacitance $C_4$, a current profile $i_{D2}$ 710 for a current through the diode $D_2$, a current profile $i_{D1}$ 709 for a current through the diode $D_1$.

In this example, the MOSFETs 305 and 401 switch in complementary fashion with a dead time of 200 ns. During the dead times, the current can commutate from the disconnecting MOSFET into the body diode of the other MOSFET, which is then switched on (almost) without power loss by means of zero voltage switching (ZVS). The diodes $D_1$ and $D_2$ switch asynchronously in relation to the MOSFETs 305 and 401, the switched-on times being different and shifted in phase. In this example, it continues to hold that: $C_4=C_{r1}=C_{r2}=400$ nF and $L_r=50$ µH Graphs for Operating Mode 2

Figure 8:
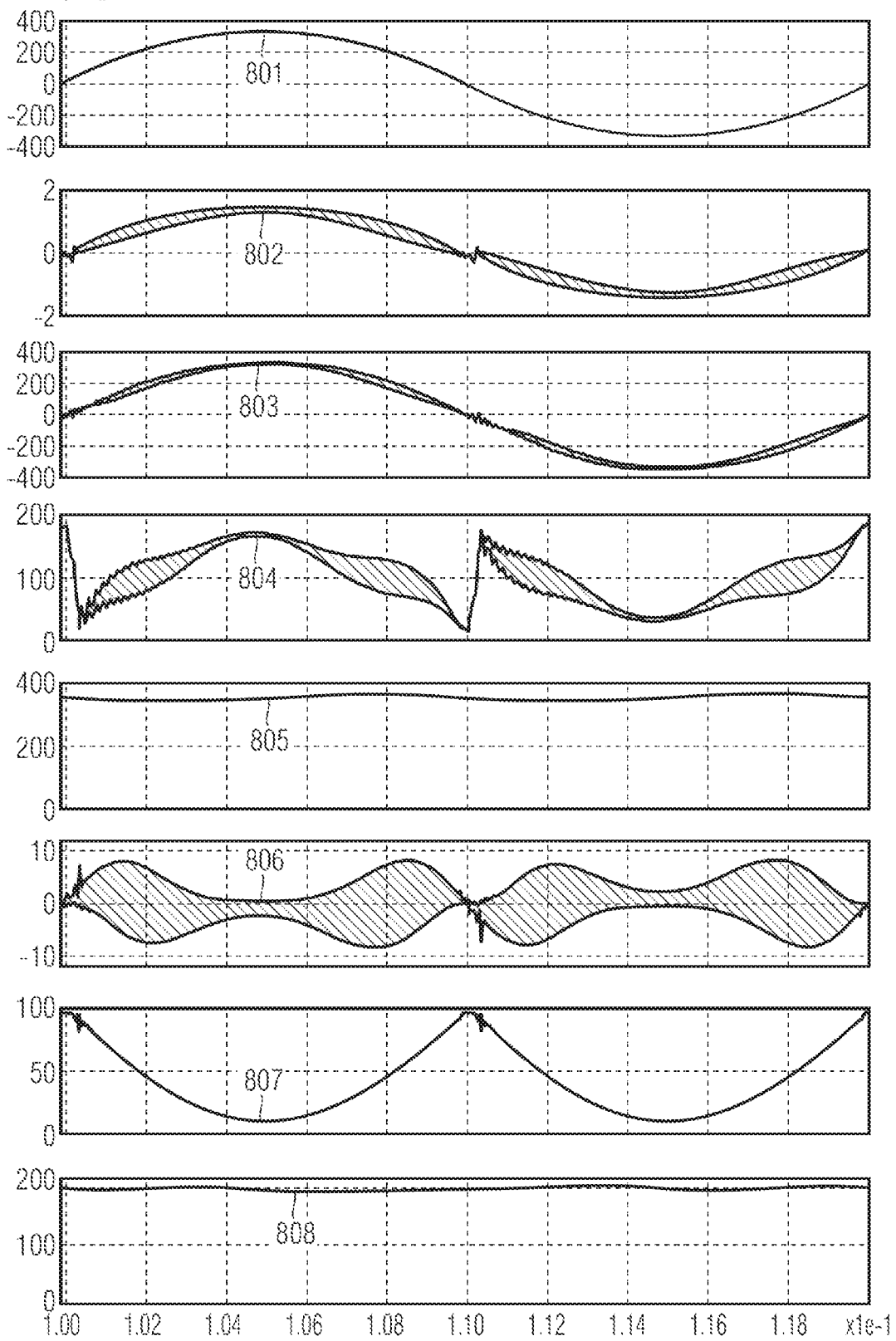
FIG. 8 shows a graph with multiple signal profiles over time (operating mode 2) according to embodiments herein.

FIG. 8 shows a graph with multiple signal profiles over time. It shows:

a voltage profile $U_{in}$ 801 on the AC power source AC, a current profile $i_L$ 802 for a current through the inductance L, a voltage profile $U_{Cr1}$ 803 for a voltage across the capacitance $C_{r1}$, a voltage profile $U_{Cr2}$ 804 for a voltage across the capacitance $C_{r2}$, a voltage profile $U_{C4}$ 805 for a voltage across the capacitance $C_4$, a current profile $i_{Cr1}$ 806 for a current through the capacitance $C_{r1}$, a duty cycle 807 for the MOSFET 305 during the positive half-cycle of the signal 601 and for the MOSFET 306 during the negative half-cycle of the signal 601, a voltage profile $U_{out}$ 808 for a voltage across the load R.

By way of example, FIG. 8 therefore shows operation at a 230 V grid voltage $U_{in}$ for a power draw of 200 W. The transformation ratio ii of the transformer 310 is Q=1, and the output DC voltage $U_{out}$=200V. The resonant circuit is formed from $C_{r1}=C_{r2}=400$ nF and $L_r=50$ µH. The capacitance $C_4$ is chosen to be $C_4=200$ µF in this case in operating mode 2.

In the present operating mode 2, the duty cycle of the switch 305 shows a profile over a grid period that largely corresponds to that of a conventional PFC stage. The voltage 805 across the capacitance C4 has a voltage ripple at twice the grid frequency, and the voltage ripple in the output voltage $U_{out}$ shows four times the grid frequency.

Figure 9:
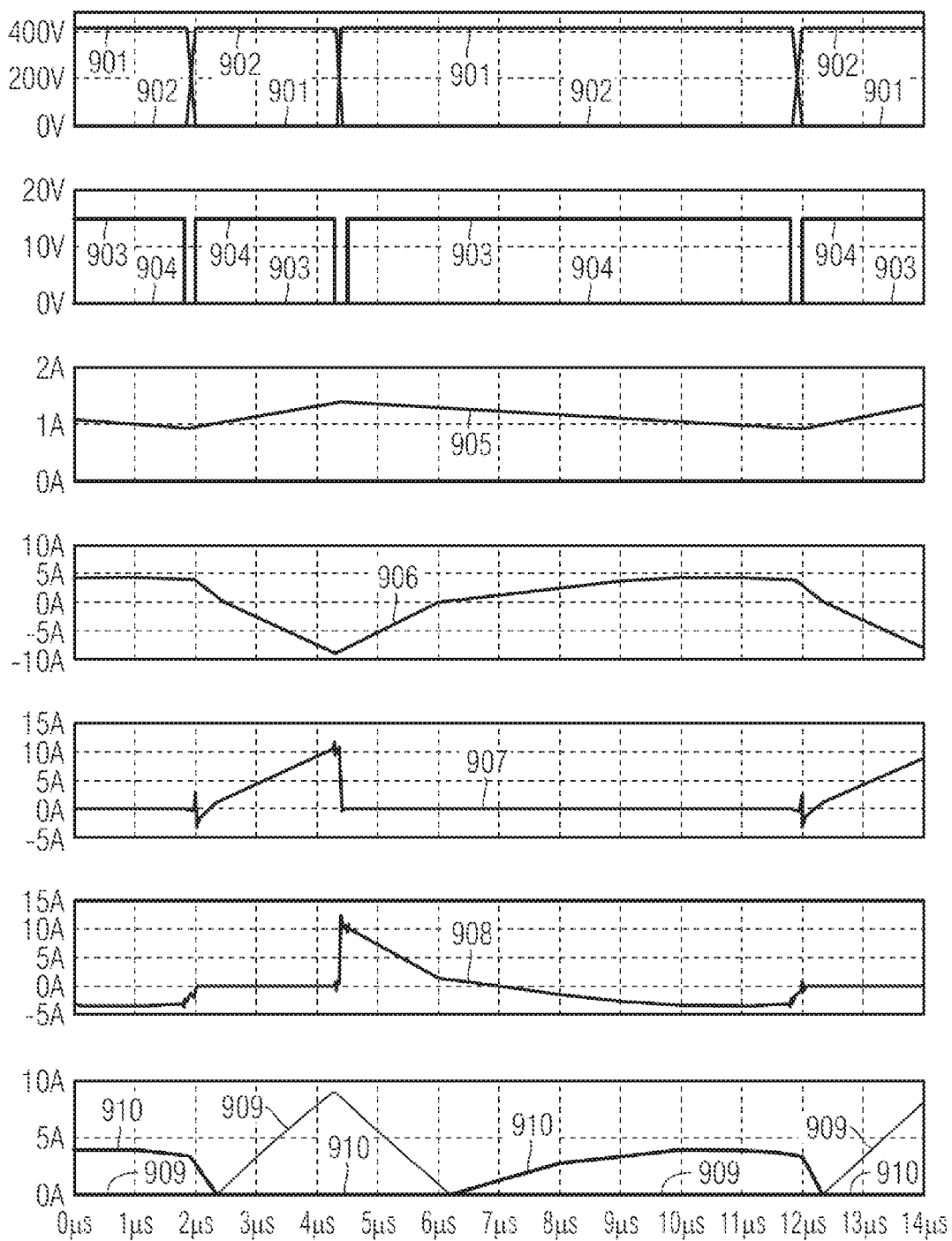
FIG. 9 shows a graph that represents a detail at the operating point around the positive peak of the grid voltage ($U_{in}$=325V, $I_{in}$=1.23 A) over a switching period in operating mode 2 according to embodiments herein.

FIG. 9 is a graph that shows a detail at the operating point around a positive peak of the grid voltage ($U_{in}$=325V, $I_{in}$=1.23 A) over a switching period in operating mode 2. In this case, FIG. 9 comprises a voltage profile 901 between the source connection and the drain connection of the MOSFET 305, a voltage profile 902 between the source connection and the drain connection of the MOSFET 401, a voltage profile 904 on the gate connection of the MOSFET 305, a voltage profile 903 on the gate connection of the MOSFET 401, the current profile $i_L$ 905 of a current through the inductance L, the current profile $i_{Cr1}$ 906 of a current through the capacitance $C_{r1}$, a current profile $i_{305}$ 907 for a current through the MOSFET 305, a current profile $i_{C4}$ 908 for a current through the capacitance $C_4$, a current profile $i_{D2}$ 910 for a current through the diode $D_2$, a current profile $i_{D1}$ 909 for a current through the diode $D_1$.

In this example, the MOSFETs 305 and 401 switch in complementary fashion with a dead time of 200 ns. During the dead times, the current can commutate from the disconnecting MOSFET into the body diode of the other MOSFET, which is then switched on without power losses by means of zero voltage switching (ZVS). The diodes $D_1$ and $D_2$ switch asynchronously in relation to the MOSFETs 305 and 401, the switched-on times being different and shifted in phase. In this case too, it holds that: $C_4=200$ µF, $C_{r1}=C_{r2}=400$ nF and $L_r=50$ µH.

Exemplary Control Concept

In particular, control of the respective converter circuit involves the following measured variables being captured:

Input voltage $U_{in}$ (with polarity)

Input current $i_{in}$ (with polarity)

Output voltage $U_{out}$

Figure 10:
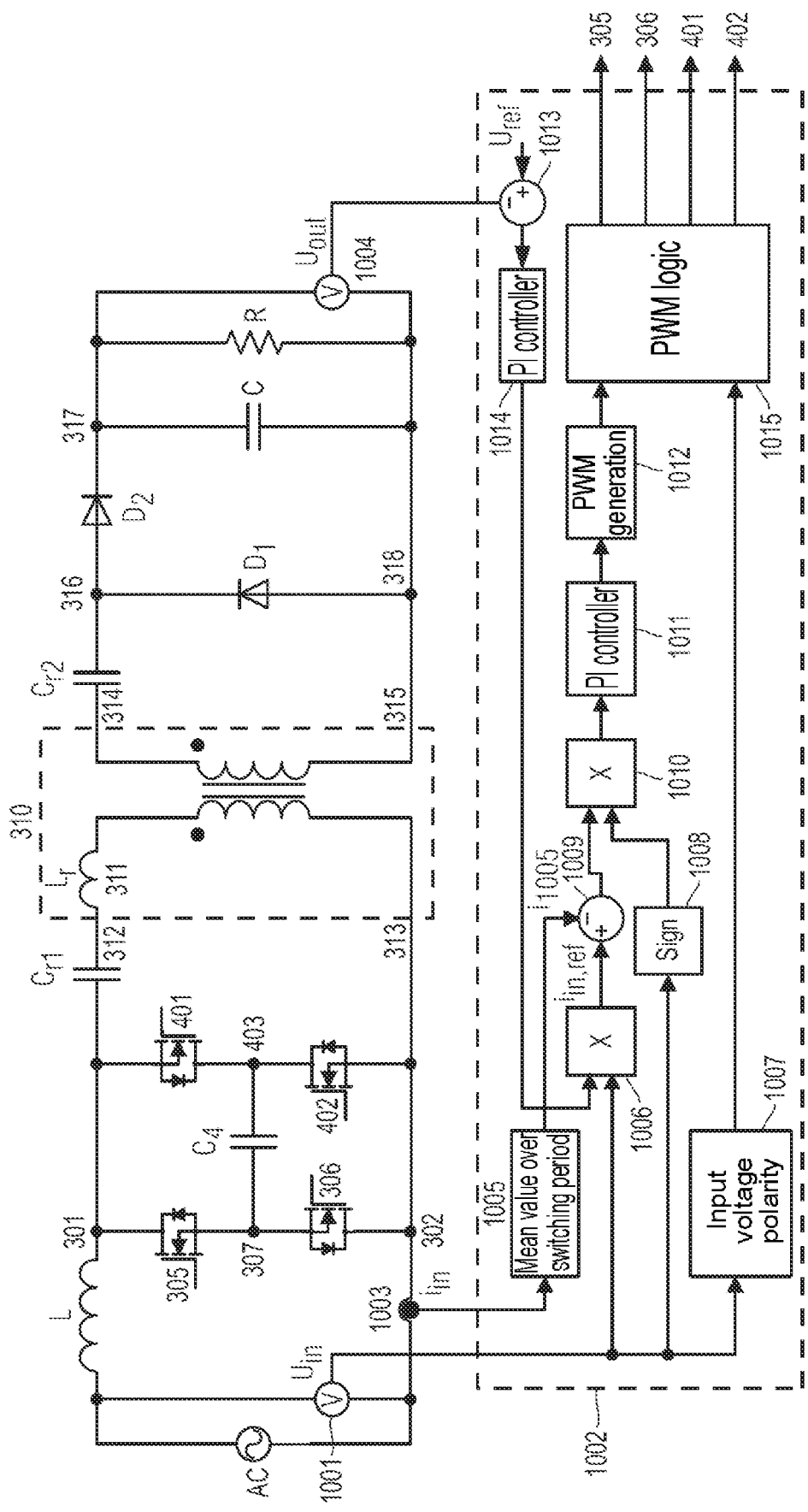
FIG. 10 is a circuit based on the circuit shown in FIG. 4 with a closed-loop control for actuating the electronic switches according to embodiments herein.

FIG. 10 shows a circuit based on the circuit shown in FIG. 4, wherein, in FIG. 10, there is additionally arranged, in parallel with the AC power source AC, a means for voltage measurement 1001 that provides a closed-loop control 1002 with the measured input voltage $U_{in}$. Additionally, the negative pole of the AC power source AC and the node 302 have a means for current measurement 1003 arranged between them that measures the input current $i_{in}$ and provides it for the closed-loop control 1002. Arranged in parallel with the load R is a means for voltage measurement 1004 that provides the closed-loop control 1002 with the measured output voltage $U_{out}$.

The closed-loop control 1002 comprises a unit 1005 that takes the measured input current $i_{in}$ as a basis for determining an average for the current over a switching period and provides said average as an averaged current signal $i_{1005}$ for a component 1009. The measured input voltage $U_{in}$ is supplied to the first input of a multiplying unit 1006. The measured input voltage $U_{in}$ is also supplied to a unit 1008 that provides an arithmetic sign function, i.e. supplies the arithmetic sign (+1 if the input signal is larger than 0; 0 if the input signal is equal to 0; −1 if the input signal is smaller than 0) of the input signal to the first input of a multiplying unit 1010. Additionally, the measured input voltage $U_{in}$ is supplied to a unit 1007 that determines the polarity of the input voltage and forwards the result to a PWM logic unit 1015.

The measured output voltage $U_{out}$ is supplied to a component 1013 to which a reference voltage $U_{ref}$ is also supplied. At its output, the component 1013 provides a differential voltage $U_{ref}-U_{out}$ for the input of a PI controller 1014. The output of the PI controller 1014 is connected to the second input of the multiplying unit 1006.

At the output of the multiplying unit 1006, a reference current signal $i_{in,ref}$ is provided for the component 1009. At its output, the component 1009 provides a differential current signal $i_{in,ref}-i_{1005}$ for the second input of the multiplying unit 1010. The output of the multiplying unit 1010 is connected to the input of a PI controller 1011, the output of which is connected to the input of a PWM generation unit 1012. The output of the PWM generation unit 1012 is connected to the PWM logic unit 1015. The PWM logic unit 1015 provides the actuating signals for the MOSFETs 305, 306, 401 and 402.

The output voltage $U_{out}$ is regulated by means of the PI controller 1014, the output manipulated variable from which is multiplied by the input voltage $U_{in}$ and prescribes the reference current signal $i_{in,ref}$. The measured and averaged current $i_{1005}$ is subtracted from the reference current signal $i_{in,ref}$ and the control difference is transferred to the PI controller 1011. The measured input current $i_{in}$ is averaged by means of the unit 1005, preferably over at least one switching period, in order to filter out the inductor current ripple; averaging can be achieved using a low pass filter, for example.

The unit 1008 provides the arithmetic sign of the input voltage $U_{in}$ for the multiplying unit 1010 and thus achieves the effect that different input voltage polarities can be processed according to their absolute value. Additionally, the unit 1008 can be used to determine the zero crossing of the measured input voltage $U_{in}$.

The PWM signal generated by the PWM logic unit 1015 can be distributed to the respective MOSFETs 305, 306, 401 and 402, inverted if need be and provided with a dead time for the half-bridges by means of a logic unit in accordance with the input polarity.

Output Voltage Ripple Reduction in Operating Mode 2

A possible cause of an output voltage ripple is discontinuous power draw from the 50 Hz AC power grid.

Figure 11:
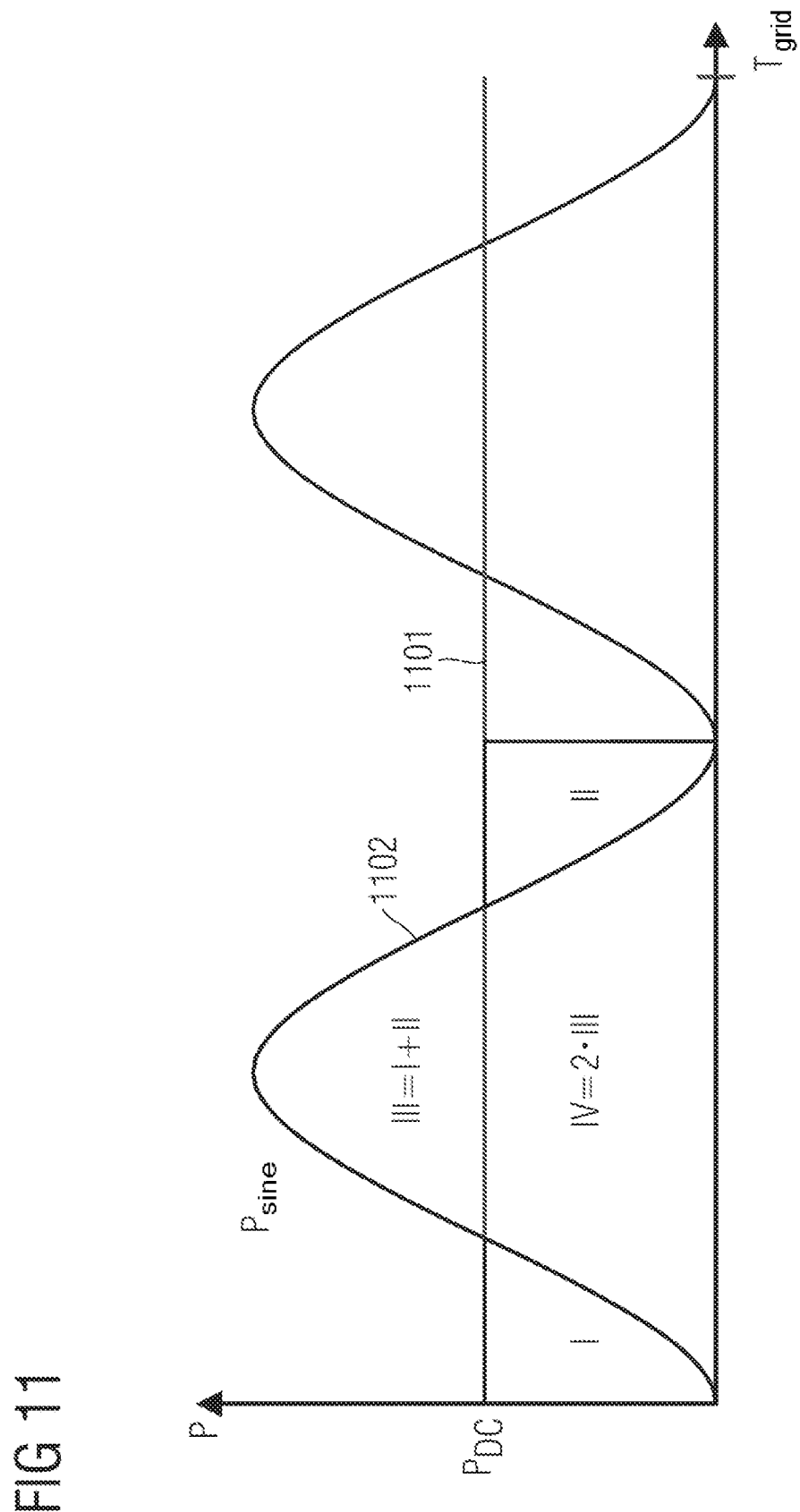
FIG. 11 shows a graph for comparing an instantaneous power on the basis of a DC variable and a sinusoidal AC variable according to embodiments herein.

FIG. 11 shows a graph for the comparison of an instantaneous power based on a DC variable 1101 and a sinusoidal AC variable 1102 on the basis of the grid period duration. While the power based on the DC variable 1101 is constant, the power based on the sinusoidal AC variable varies between zero and twice the power of the DC variable.

In accordance with FIG. 11, a continuous instantaneous power based on the AC variable 1102 requires a third of the energy (corresponds to area III) transmitted in half a grid period (e.g. 10 ms at 50 Hz) to be buffered stored. This requires a high capacitance $C_4$; hence, a significant reduction in the output voltage ripple is possible primarily in operating mode 2 (which has a high capacitance $C_4$, of course).

To reduce or eliminate the output voltage ripple, the diodes $D_1$ and $D_2$ are replaced by MOSFETs in FIG. 4.

Figure 12:
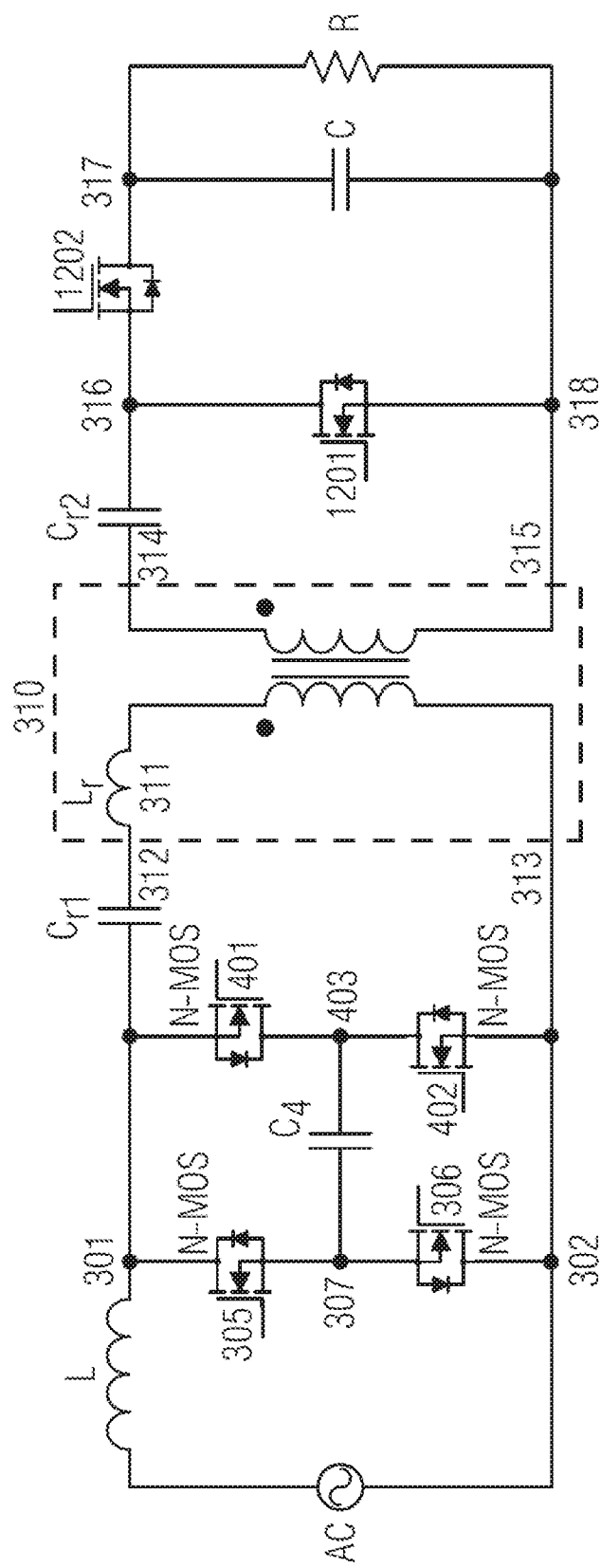
FIG. 12 shows a circuit based on the circuit shown in FIG. 4, wherein the diodes D1 and D2 have been replaced by n-channel MOSFETs according to embodiments herein.

FIG. 12 shows a circuit based on the circuit shown in FIG. 4, wherein the diode $D_1$ has been replaced by an n-channel MOSFET 1201 and the diode $D_2$ has been replaced by an n-channel MOSFET 1202. The source connection of the MOSFET 1201 is connected to the node 318. The drain connection of the MOSFET 1201 and the source connection of the MOSFET 1202 are each connected to the node 316. The drain connection of the MOSFET 1202 is connected to the node 317. The respective gate connections of the MOSFETs 1201 and 1202 can be actuated by a closed-loop control in a suitable manner. In this regard, the closed-loop control shown and explained in FIG. 10 can be used and augmented accordingly.

Hence, efficient synchronous rectification can be achieved. Synchronous rectification is advantageous in the case of low output voltages and high output currents to achieve good efficiency.

A reduction in the grid-frequency-dependent output voltage ripple is possible by virtue of the MOSFETs 1201 and 1202 remaining switched on for longer than would be necessary as a result of synchronous rectification. As a departure from the conventional function of synchronous rectification, in which only a flow of current with the direction of flow from MOSFET source to MOSFET drain occurs, it is also possible for a flow of current in the direction from MOSFET drain to MOSFET source to occur in this case. When an instantaneous value of the output voltage is smaller than a DC component ($u_{out}(t) < \bar{u}_{out}$), the output network operates as a step-up converter integrated in the circuit with a flow of energy to the capacitance C. To this end, the MOSFET 1201 can remain switched on for longer than would be necessary as a result of synchronous rectification, which means that a direction of current flow from the drain connection to the source connection occurs. At a particular, controlled instant, the MOSFET 1201 is disconnected and the MOSFET 1202 is switched on in complementary fashion thereto. It then commutates the flow of current from the MOSFET 1201 to the MOSFET 1202 via the capacitance C to the node 318. For the other case, in which the instantaneous value of the output voltage is larger than the DC component ($u_{out}(t) > \bar{u}_{out}$), the output network operates as a step-down converter integrated in the circuit with a direction of energy flow from the capacitance C back to the capacitance $C_4$. In this case, as a departure from synchronous rectification, a direction of current flow from the drain connection to the source connection also occurs in the MOSFET 1202 in a particular period. The current then flows from the node 318 via the capacitance C back to the connection 314. At a particular (controlled) instant, the MOSFET 1202 is disconnected and the MOSFET 1201 is then switched on in complementary fashion. The flow of current commutates from the MOSFET 1202 to the MOSFET 1201.

Feedback Operation to the Grid

The circuit shown in FIG. 12 with the MOSFETs 1201, 1202 (synchronous rectifier MOSFETs) is also suitable for a direction of energy flow from the DC output ($U_{out}=\bar{u}_{out}$) to the AC input ($U_{in}$). Such feedback operation is possible both with a small capacitance $C_4$ (cf. operating mode 1) and with a large capacitance $C_4$ (cf. operating mode 2).

Feedback operation is distinguished from normal operation in that one of the MOSFETs 1201, 1202 is switched on if the diode of the complementary other MOSFET 1201, 1202 would be on. Hence, the MOSFET 1202 is switched on in the interval of time in normal operation in which the diode $D_1$ would be on. As a result, the diode $D_1$ or the MOSFET 1201 is off. Similarly, if the diode $D_2$ would switch on in the normal operation, then the MOSFET 1201 is switched on.

Furthermore, there may also be further actuating concepts for achieving feedback operation. In this case, the semiconductor switches 305 and 306 can be switched on permanently in each case depending on input voltage polarity in identical fashion to the method described above within the context of normal operation.

Figure 13:
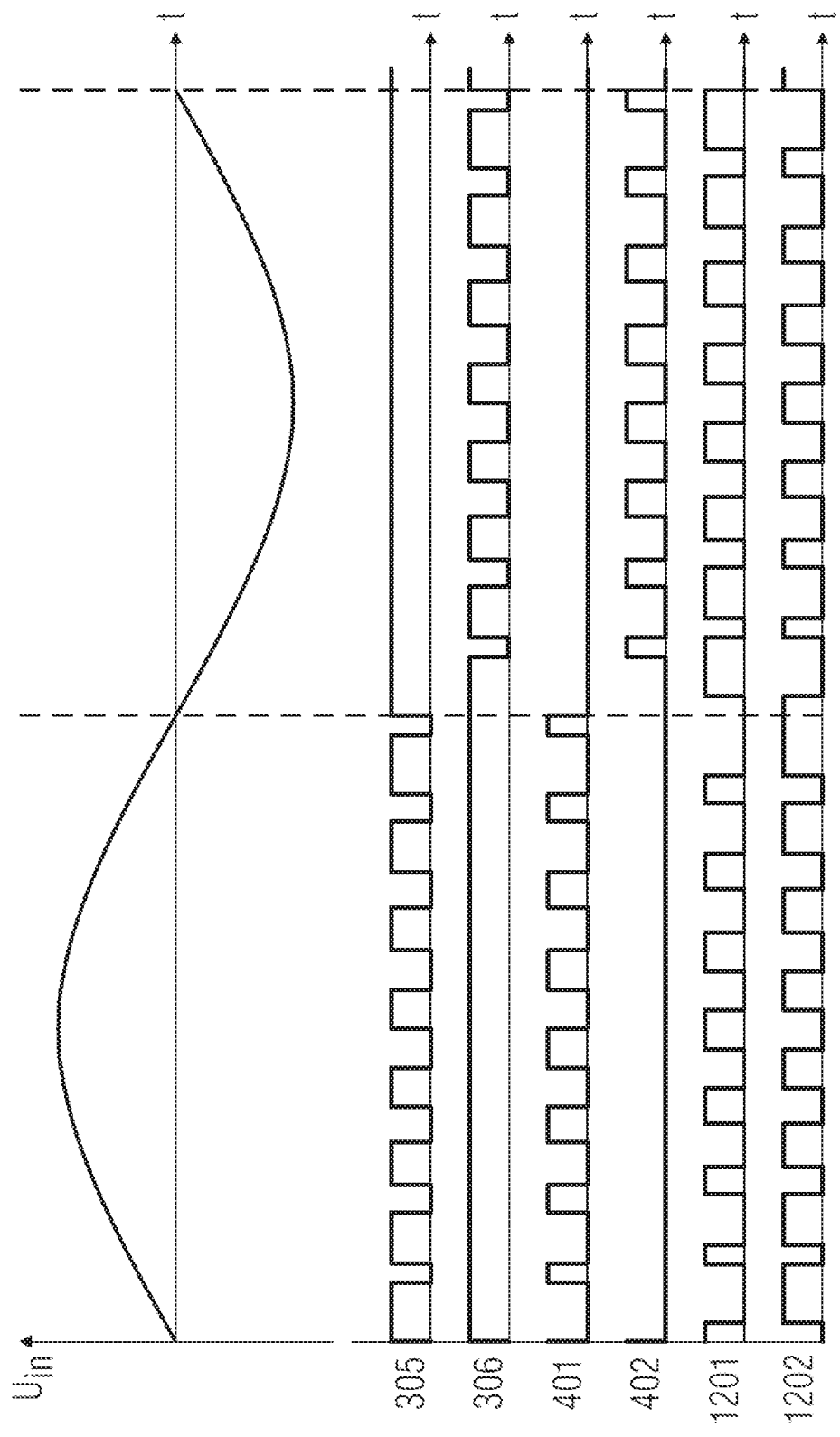
FIG. 13 shows a graph without actuating signals for the MOSFETs on the basis of a voltage profile Uin on the AC voltage source AC based on FIG. 5 according to embodiments herein.

FIG. 13 shows a graph with actuating signals for the MOSFETs 305, 306, 401 and 402 on the basis of a voltage profile $U_{in}$ on the AC power source AC based on FIG. 5. Additionally, FIG. 13 shows the actuating signals for the MOSFETs 1201 and 1202.

When the input voltage is positive, the MOSFETs 305 and 1202 switch based on the same PWM signal, the actuating signal for the MOSFET 1202 being shifted in phase/lagging in comparison with the actuating signal for the MOSFET 305. When the input voltage is negative, the MOSFETs 306 and 1201 switch based on the same PWM signal, the actuating signal for the MOSFET 1201 being shifted in phase/lagging in comparison with the actuating signal for the MOSFET 306.

A more detailed description of the actuating concepts is shown below by way of example for a positive input voltage 501. In all three actuating concepts, the MOSFET 305 switches in complementary fashion to the MOSFET 401, the MOSFET 306 switches in complementary fashion to the MOSFET 402 and the MOSFET 1201 switches in complementary fashion to the MOSFET 1202.

Example: Control of Energy Flow by Means of Phase Shifting

The flow of energy is determined by a phase angle between the primary-side pulse width modulation (PWM)—in this case the MOSFET 305—and the secondary-side PWM—in this case the MOSFET 1202. The switched-on period $t_{on}$ is constant both for the MOSFET 305 and for the MOSFET 1202. For a phase angle $\alpha$ according to $$0° < \alpha < 180°,$$

energy is transmitted from the secondary-side DC output to the primary-side AC input. For a phase angle $\alpha$ according to $$180° < \alpha < 360°,$$

on the other hand, energy is transferred from the AC input to the DC output. For a phase angle $\alpha = 0°$ or $\alpha = 180°$, no energy transmission takes place.

Figure 14:
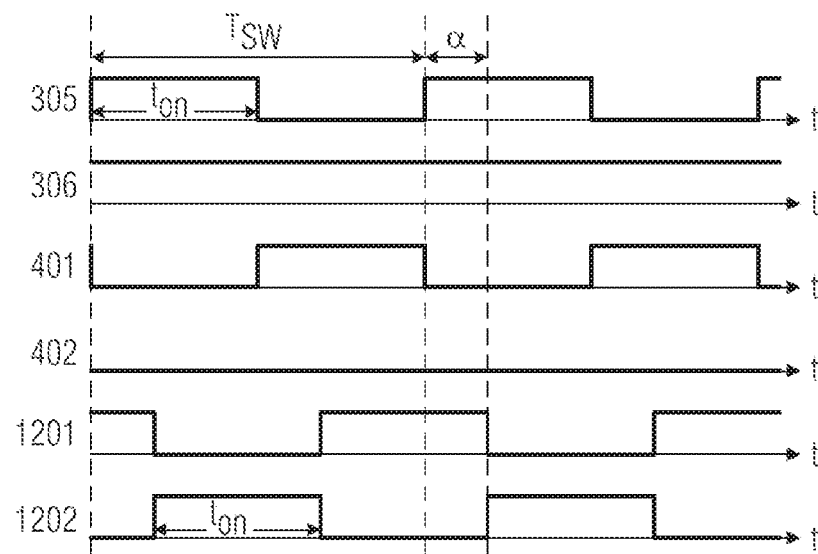
FIG. 14 shows a graph with actuating signals for the MOSFETs for control by means of phase shifting according to embodiments herein.

FIG. 14 shows a graph with actuating signals for the MOSFETs 305, 306, 401, 402, 1201 and 1202 for control by means of phase shifting. In this case, $t_{on}$ denotes the switched-on period, $T_{SW}$ denotes the duration of a switching period ($f_{SW}$ corresponds to the switching frequency, see above) and $\alpha$ denotes the phase angle.

Example: Control of Energy Flow by Means of Pulse Width Modulation

In this example, the phase angle $\alpha$ is constant and the transmitted power is determined by the switched-on period $t_{on}$. The switched-on periods of the primary-side PWM (the MOSFET 305) and the secondary-side PWM (the MOSFET 1202) are of equal magnitude. In this case, the constant phase angle $\alpha$ can be chosen such that an operating point at maximum transmission power is possible. There exists a phase angle $\alpha_+$ for a maximum transmission power from the AC input to the DC output, and a further phase angle $\alpha_-$ for corresponding feedback operation.

Figure 15:
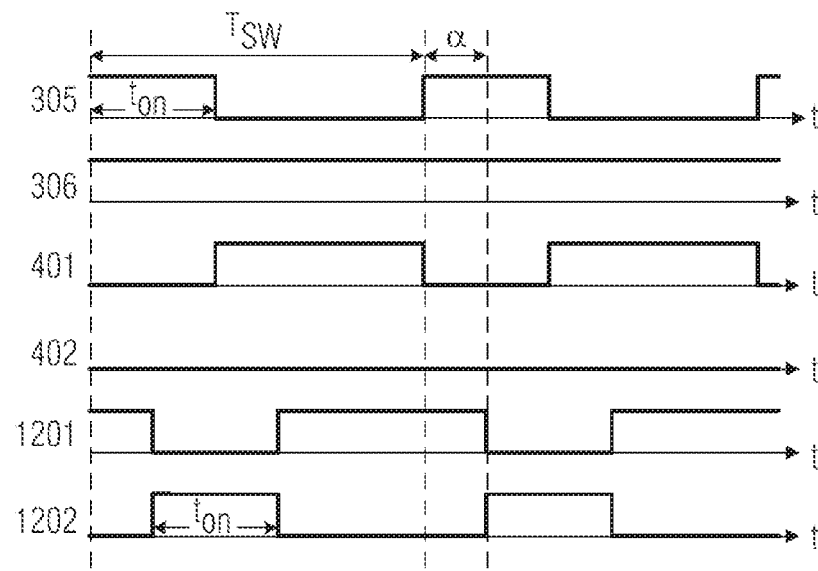
FIG. 15 shows a graph with actuating signals for the MOSFETs for control by means of pulse width modulation according to embodiments herein.

FIG. 15 shows a graph with actuating signals for the MOSFETs 305, 306, 401, 402, 1201 and 1202 for control by means of pulse width modulation.

Control of Energy Flow by Means of Different Pulse Widths/Switched-on Times

Additionally, it is an option for the flow of power to be regulated by means of a longer secondary-side PWM switched-on time for the MOSFETs 1201, 1202. In this case, the switched-on period $t_{on}$ and the phase angle $\alpha$ are kept constant, for example. Reversal of the direction of energy flow can be achieved by changing switched-on periods for the MOSFETs 1201 and 1202.

Figure 16:
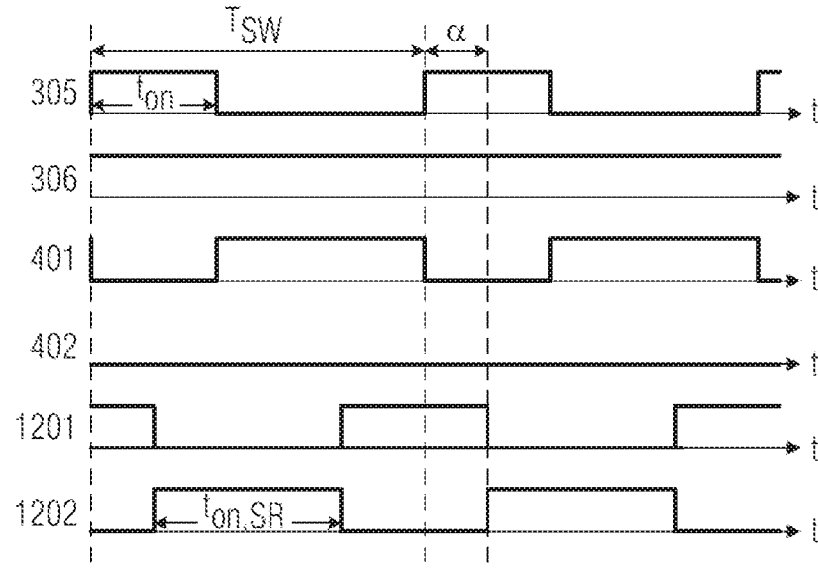
FIG. 16 shows a graph with actuating signals for the MOSFETs for control by means of different pulse widths and/or switched-on periods according to embodiments herein.

FIG. 16 shows a graph with actuating signals for the MOSFETs 305, 306, 401, 402, 1201 and 1202 for control by means of different pulse widths and/or switched-on periods.

Comparison of the Actuating Methods

The control methods discussed by way of example involve a parameter being varied in order to control energy flow. In order to transmit a lower power, it is possible, during a switching period, for too much energy to be transferred in the desired direction at first and then for some of it to be transferred back to the source again in the same switching period. This leads to high currents in the partial load range. For optimized partial load actuation, all three parameters phase angle $\alpha$, switched-on period $t_{on}$ of the MOSFET 305 and switched-on period of the MOSFET 1202 can be adjusted for each operating point as appropriate.

Alternative Examples

FIG. 4 shows, by way of example between grid AC voltage AC and transformer 310, an option for a first switching path comprising the MOSFETs 305 and 306 and a second switching path comprising the MOSFETs 401 and 402 and the capacitance $C_4$, which is arranged between the center taps of the two MOSFETs of the first switching path and the two MOSFETs of the second switching path. The capacitance of the second switching path may also be arranged at a different point in the second switching path. Further, it is possible for the MOSFETs of the first switching path to be oriented differently. Finally, output capacitances of the respective MOSFETs can be taken into consideration.

FIG. 17 shows an example of three variants for the embodiment of the first switching path and the second switching path.

In a variant 1710, the first switching path has a series circuit comprising an n-channel MOSFET 1711 and an n-channel MOSFET 1712, wherein the source connection of the MOSFET 1711 is connected to the node 301, the drain connection of the MOSFET 1711 is connected to the drain connection of the MOSFET 1712 and the source connection of the MOSFET 1712 is connected to the node 302. The second switching path comprises an n-channel MOSFET 1713, an n-channel MOSFET 1714 and a capacitance $C_{1715}$. The three components of the second switching path are arranged in a series circuit as follows: the source connection of the MOSFET 1713 is connected to the node 301, the drain connection of the MOSFET 1713 is connected to the drain connection of the MOSFET 1714 via the capacitance $C_{1715}$ and the source connection of the MOSFET 1714 is connected to the node 302.

In a variant 1720, the first switching path has a series circuit comprising an n-channel MOSFET 1721 and an n-channel MOSFET 1722, wherein the drain connection of the MOSFET 1721 is connected to the node 301, the source connection of the MOSFET 1721 is connected to the source connection of the MOSFET 1722 and the drain connection of the MOSFET 1722 is connected to the node 302. The second switching path comprises an n-channel MOSFET 1723, an n-channel MOSFET 1724 and a capacitance $C_{1725}$. The three components of the second switching path are arranged in a series circuit as follows: the source connection of the MOSFET 1723 is connected to the node 301, the drain connection of the MOSFET 1723 is connected to the drain connection of the MOSFET 1724 via the capacitance $C_{1725}$ and the source connection of the MOSFET 1724 is connected to the node 302.

A variant 1730 corresponds largely to the circuit shown in FIG. 4: the MOSFET 305 has been replaced by a MOSFET 1731, the MOSFET 306 has been replaced by a MOSFET 1732, the MOSFET 401 has been replaced by a MOSFET 1733 and the MOSFET 402 has been replaced by a MOSFET 1734. The capacitance $C_4$ has been replaced by a capacitance $C_{1735}$. The MOSFETs 1731 to 1734 each have an output capacitance that is arranged in parallel with the drain and source connections.

Figure 20:
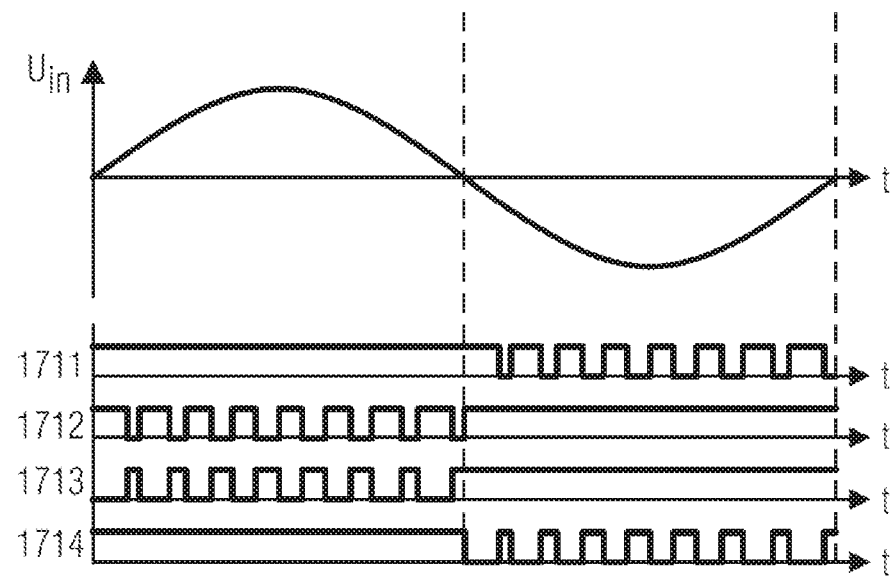
FIG. 20 shows a graph with actuating signals for the according to variant 1710 from FIG. 17 according to embodiments herein.
Figure 21:
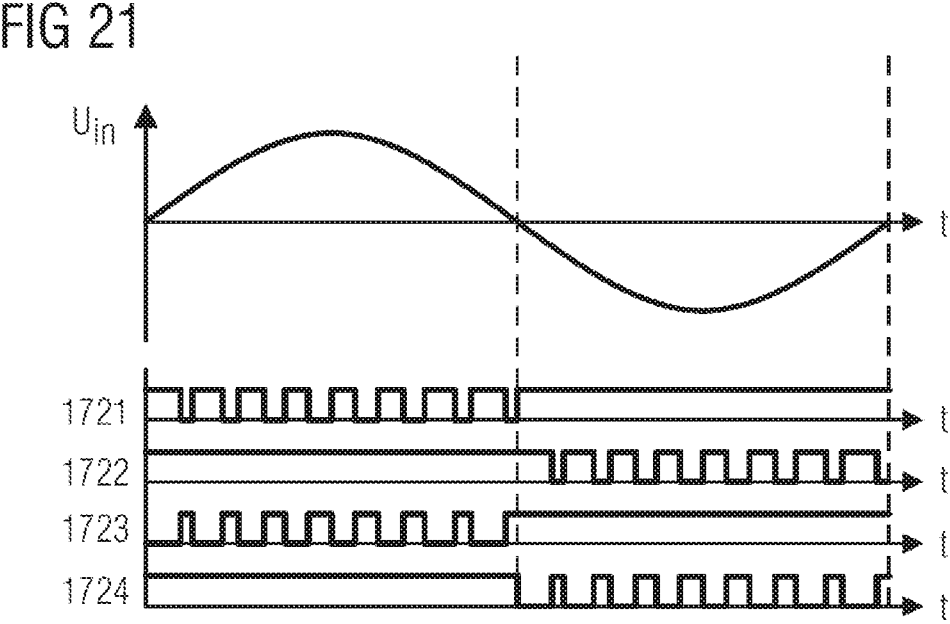
FIG. 21 shows a graph with actuating signals for the according to variant 1720 from FIG. 17 according to embodiments herein.

FIG. 20 shows a graph for the actuating signals for the MOSFETs 1711 to 1714 on the basis of a voltage profile $U_{in}$ on the AC power source AC for the variant 1710 from FIG. 17. Correspondingly, FIG. 21 shows a graph for the actuating signals for the MOSFETs 1721 to 1724 on the basis of a voltage profile $U_{in}$ on the AC power source AC for the variant 1720 from FIG. 17.

Further, as an alternative to the MOSFETs connected in series in the variants 1710, 1720 and 1730, it would also be possible to use reverse blocking IGBTs (RB-IGBTs) connected in parallel with one another.

Figure 22:
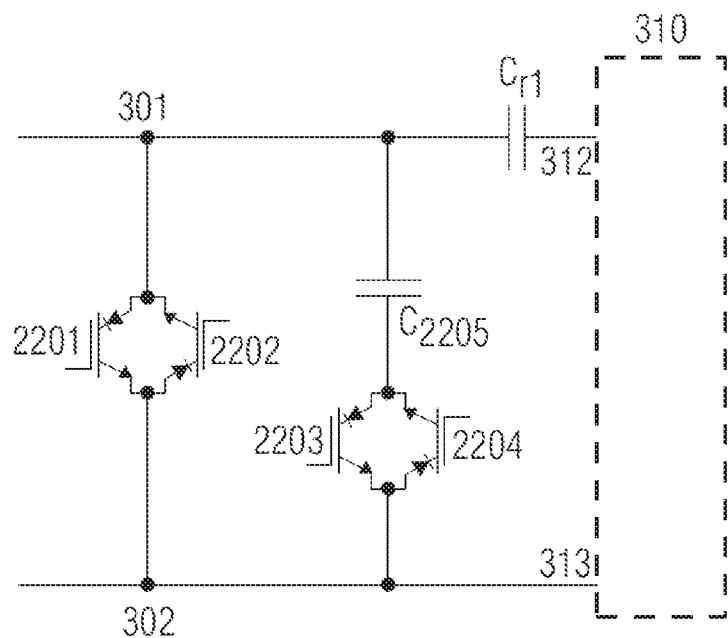
FIG. 22 shows an exemplary further variant using RB-IGBTs in the first switching path and in the second switching path according to embodiments herein.

FIG. 22 shows an alternative variant in which the first switching path has a parallel circuit comprising two RB-IGBTs 2201 and 2202 arranged in parallel in opposite directions. The second switching path is connected in parallel with the first switching path and has a parallel circuit comprising two RB-IGBTs 2203 and 2204 that are arranged in parallel in opposite directions and connected in series to a capacitance $C_{2205}$.

The collector connection of the RB-IGBT 2201 is connected to the emitter connection of the RB-IGBT 2202 and to the node 301. The emitter connection of the RB-IGBT 2201 is connected to the collector connection of the RB-IGBT 2202 and to the node 302. The collector connection of the RB-IGBT 2203 is connected to the emitter connection of the RB-IGBT 2204 and via the capacitance $C_{2205}$ to the node 301. The emitter connection of the RB-IGBT 2203 is connected to the collector connection of the RB-IGBT 2204 and to the node 302.

Figure 23:
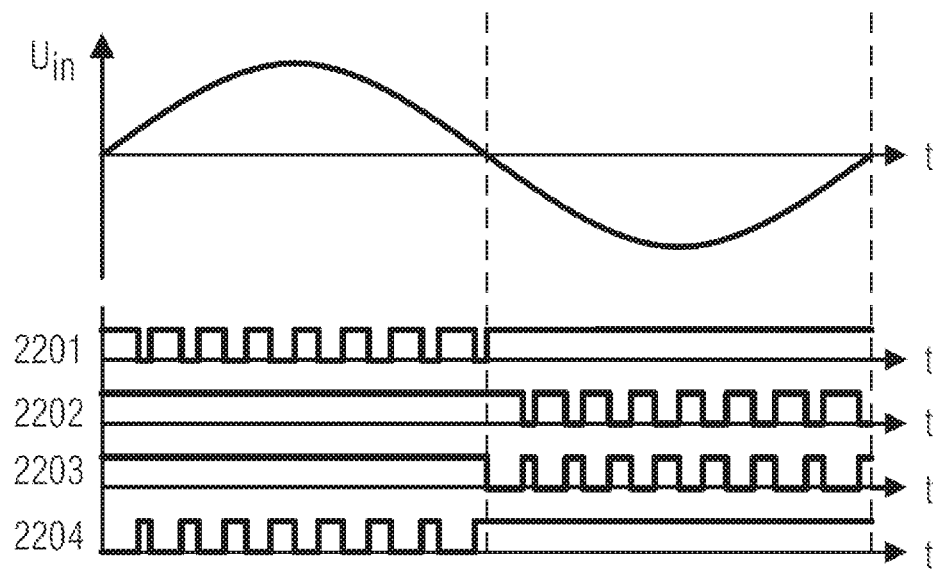
FIG. 23 shows a graph with actuating signals for the variant shown in FIG. 22 according to embodiments herein.

FIG. 23 shows a graph with actuating signals for the RB-IGBTs 2201 to 2204 on the basis of a voltage profile $U_{in}$ on the AC power source AC for the variant shown in FIG. 22.

Further Example: Output Current with Low Ripple

Figure 18:
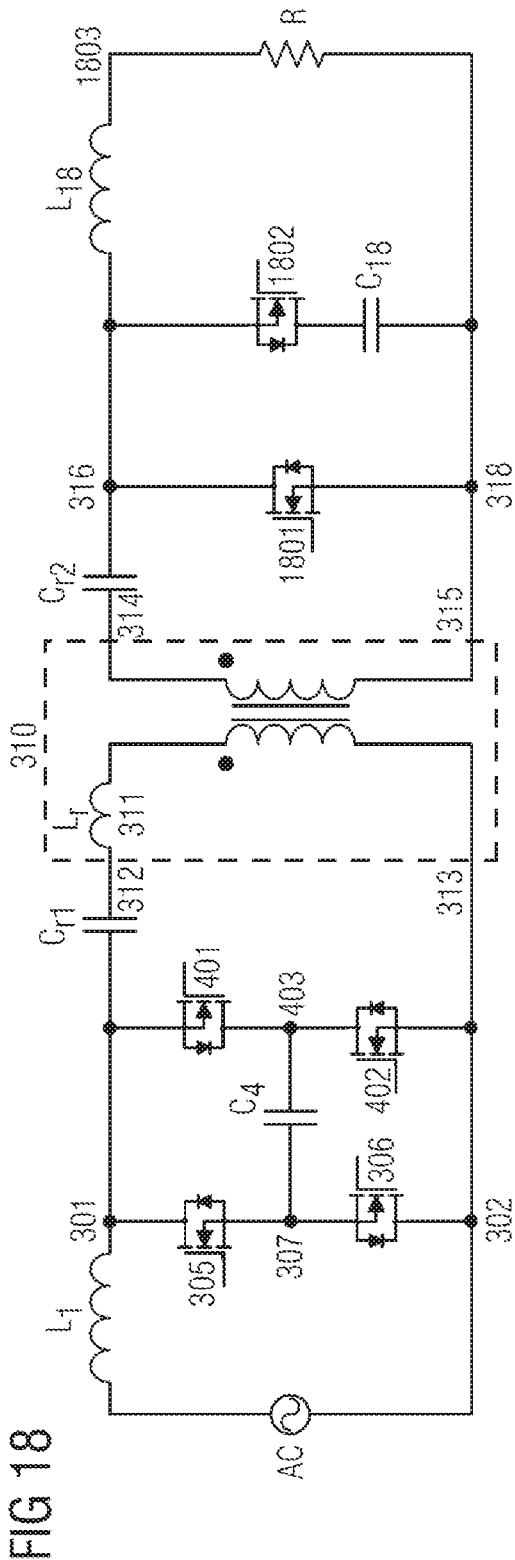
FIG. 18 shows an exemplary circuit that allows an output current having low ripple according to embodiments herein.

FIG. 18 shows an exemplary circuit based on FIG. 4 whose secondary side has the following changes in comparison with FIG. 4, however: the node 316 is connected to a node 1803 via an inductance $L_{18}$. The load R is arranged between the node 1803 and the node 318. Arranged between the node 316 and the node 318 is an n-channel MOSFET 1801, wherein the source connection of the MOSFET 1801 is connected to the node 318 and the drain connection of the MOSFET 1801 is connected to the node 316. The source connection of an n-channel MOSFET 1802 is connected to the node 316, the drain connection of the n-channel MOSFET 1802 being connected to the node 318 via a capacitance $C_{18}$. The gate connections of the MOSFETs 1801 and 1802 are actuated by means of a closed-loop control as appropriate. The inductance $L_{18}$ is an output inductor.

The circuit shown in FIG. 18 is also implementable as a variant without potential isolation by virtue of the transformer 310 being dispensed with and a discrete resonant inductance being inserted. In this case, the two resonant capacitances $C_{r1}$ and $C_{r2}$ can be combined into one component.

Further Example: Isolated Back-to-Back Converter

Figure 19:
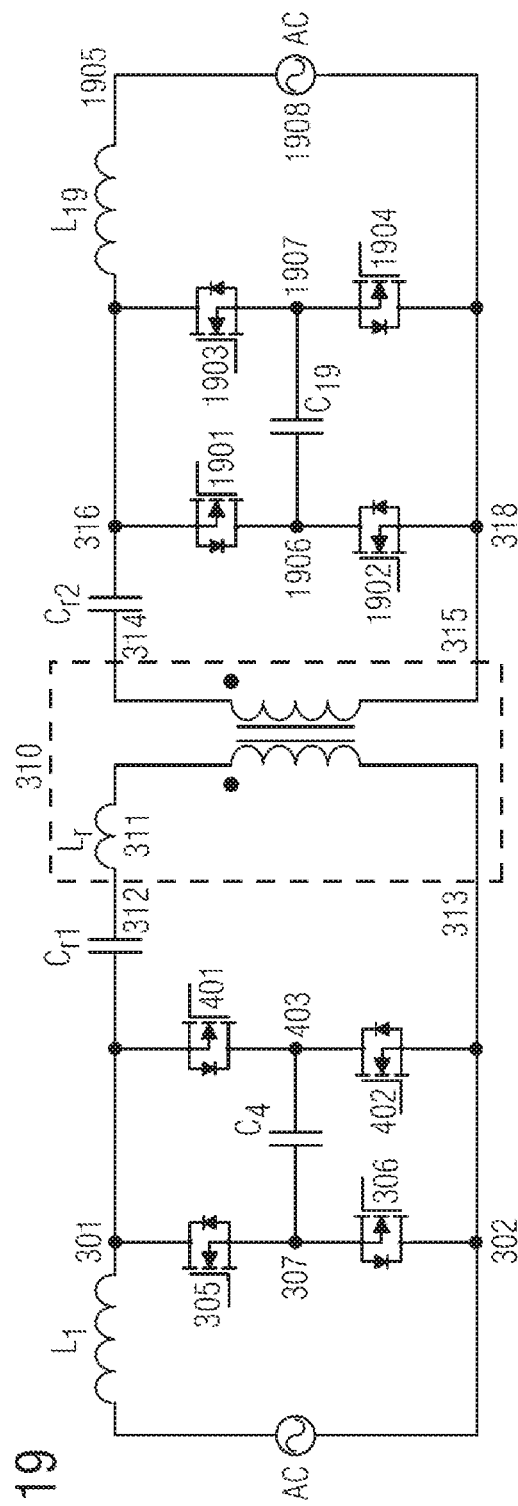
FIG. 19 shows an exemplary circuit for an isolated back-to-back converter according to embodiments herein.

FIG. 19 shows an exemplary circuit based on FIG. 4 whose secondary side has the following changes in comparison with FIG. 4, however: the node 316 is connected to a node 1905 via an inductance $L_{19}$. The source connection of an n-channel MOSFET 1901 is connected to the node 316 and the drain connection of the MOSFET 1901 is connected to a node 1906. The drain connection of an n-channel MOSFET 1902 is connected to the node 1906 and the source connection of the MOSFET 1902 is connected to the node 318. The drain connection of an n-channel MOSFET 1903 is connected to the node 316 and the source connection of the MOSFET 1903 is connected to a node 1907. The source connection of an n-channel MOSFET 1904 is connected to the node 1907 and the drain connection of the MOSFET 1904 is connected to the node 318. The node 1906 is connected to the node 1907 via a capacitance $C_{19}$.

Connected between the node 1905 and the node 318 is an AC power source 1908.

The circuit shown in FIG. 19 is an isolated back-to-back link ("back-to-back" converter). Such a circuit allows energy to be interchanged between different AC power grids, for example.

This circuit can also be implemented as a variant without potential isolation by virtue of the transformer 310 being dispensed with and a discrete resonant inductance being inserted. In this case, the two resonant capacitances $C_{r1}$ and $C_{r2}$ can be combined into one component.

Although the invention has been illustrated and described in more detail by means of the at least one exemplary embodiment shown, the invention is not restricted thereto and other variations can be derived therefrom by a person skilled in the art without departing from the scope of protection of the invention.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

FURTHER SUMMARY AND PERMUTATIONS OF DIFFERENT EMBODIMENTS

Clause 1. A circuit comprising:
a first switching path comprising at least one electronic switch, the first switching path operable to selectively block current flow in both directions through the first switching path, the first switching path operable to selectively allow current flow in both directions through the first switching path; and a second switching path comprising two electronic switches and a capacitor, each of the two electronic switches in the second path including an inherent diode.

Clause 2. The circuit as in any clause, wherein the two electronic switches in the second switching path are two parallel-connected electronic switches, each of the two parallel-connected switches including an inherent diode.

Clause 3. The circuit as in any clause, wherein the two electronic switches of the second switching path are RB-IGBT devices.

Clause 4. The circuit as in any clause, wherein the electronic switches of the second switching path are two parallel-connected RB-IGBT devices, the RB-IGBT devices being oriented in parallel with one another, but in opposite directions.

Clause 5. The circuit as in any clause, wherein the two electronic switches of the second switching path are two series-connected electronic switches, each of the two electronic switches including an inherent diode.

Clause 6. The circuit as in any clause, wherein the two electronic switches of the second switching path are two MOSFET devices oriented in series with one another but disposed in opposite directions.

Clause 7. The circuit as in any clause, wherein the first switching path comprises two n-channel MOSFET devices that are connected in series and whose drain connections are interconnected.

Clause 8. The circuit as in any clause, wherein the first switching path comprises two n-channel MOSFET devices that are connected in series and whose source connections are interconnected.

Clause 9. The circuit as in any clause, wherein the second switching path comprises a series circuit, the series circuit comprising a comb of a first n-channel MOSFET device, the capacitor, and a second n-channel MOSFET device, the capacitor being arranged between the drain connections of the first n-channel MOSFET device and the second n-channel MOSFET device; and wherein the second switching path is arranged in parallel with the first switching path.

Clause 10. The circuit as in any clause, wherein the first switching path has a series circuit comprising two switch circuits; wherein the electronic switch circuits of the second switching path are connected in series; and wherein a first center tap of the switch circuits of the first switching path is connected to a second center tap of the electronic switches of the second switching path.

Clause 11. The circuit as in any clause, wherein the second switching path comprises a first capacitor connected in series with a first p-channel MOSFET device;

wherein the source connection of the first p-channel MOSFET device is connected to the second center tap and to the source connection of a second p-channel MOSFET;

wherein the drain connection of the second p-channel MOSFET is connected to a second capacitor.

Clause 12. The circuit as in any clause, wherein the first switching path has a series circuit comprising two switch circuits;

wherein the electronic switches of the second switching path are connected in series; and wherein the capacitance of the second switching path is arranged between a first center tap of the switch circuits of the first switching path and a second center tap of the electronic switches of the second switching path.

Clause 13. The circuit as in any clause, wherein the second switching path comprises a series circuit comprising a first n-channel MOSFET device and a second n-channel MOSFET device, which have their drain connections connected to the second center tap, wherein the capacitor of the second switching path is coupled between the second center tap and the first center tap.

Clause 14. The circuit as in any clause 1, wherein the electronic switches of the second switching path is connected in series with the capacitor.

Clause 15. The circuit as in any clause, wherein the first switching path has two series connected electronic switches disposed in opposite directions.

Clause 16. The circuit as in any clause, wherein the first switching path has two RB-IGBT devices connected in parallel in opposite directions.

Clause 17. The circuit as in any clause additionally comprising:

an input inductance that is arranged between an input of the circuit and the first switching path;

a resonant circuit comprising a resonant inductance and a resonant capacitance, the resonant circuit being arranged between the first switching path and an output of the circuit; and wherein the first switching path and the second switching path are connected in parallel with one another.

Clause 18. The circuit as in any clause, in which the resonant capacitance includes a first capacitor and a second capacitor;

wherein the first capacitor is connected in series with the resonant inductance and the primary winding of the transformer; and wherein the second capacitor is connected to a secondary winding of the transformer.

Clause 19. The circuit as in any clause, wherein the second capacitor is connected in series to a load via a second diode, the cathode of the second diode pointing in the direction of the load; and wherein a first diode is provided whose cathode is connected to the anode of the second diode and whose anode is connected to ground.

Clause 20. The circuit as in any clause, wherein the resonant capacitance is connected to a load via a further second electronic switch;

wherein a further first electronic switch is provided, on the basis of which a current path is switchable between a node and ground, the node being arranged between the resonant capacitance and the second switch.

Clause 21. The circuit as in any clause, wherein a switching frequency at which at least one of the electronic switches of the first switching path is controlled is higher than a resonant frequency of the resonant circuit.

Clause 22. The circuit as in any clause, wherein the second switching path comprises a commutation circuit, wherein the commutation circuit is set up such that, after one of the electronic switches of the first switching path is switched off, a current flows via a diode path of one of the electronic switches and the capacitor of the second switching path.

Clause 23. The circuit as in any clause, wherein at least one of the electronic switches of the first switching path and the electronic switch of the second switching path to provide zero voltage switching.

Clause 24. The circuit as any clause, wherein the electronic switches are semiconductor switches.

Clause 25. The circuit as in any clause, wherein the electronic switches are actuated by a closed-loop control circuit.

Clause 26. The circuit as in any clause, wherein the circuit provides power factor correction.

Clause 27. A method for operating a circuit including a first switching path and a second switching path, the method comprising:
controlling the first switching path, the first switching path comprising at least one electronic switch, the first switching path operable to selectively block current flow in both directions through the first switching path, the first switching path operable to selectively allow current flow in both directions through the first switching path;
controlling the second switching path, the comprising two electronic switches and a capacitor, each of the two electronic switches in the second path including an inherent diode; and
controlling activation of the electronic switches of the first switching path and the electronic switches of the second switching path such that after one of the electronic switches of the first switching path is switched off, a current flows via a diode path of one of the electronic switches of the second switching path and through the capacitor of the second switching path.

Clause 28. The method as in any clause, further comprising: during a switched-off period for one of the electronic switches of the first switching path, discharging the capacitance of the second switching path via an electronic switch of the second switching path.

Clause 29. The method as in any clause,
wherein the circuit additionally comprises:
an input inductance that is arranged between an input of the circuit and the first switching path;
a resonant circuit comprising a resonant inductance and a resonant capacitance, the resonant circuit being arranged between the first switching path and an output of the circuit;
wherein the first switching path and the second switching path are connected in parallel with one another;
the method further comprising: controlling a switching frequency at which at least one of the electronic switches of the first switching path is operated to be higher than a resonant frequency of the resonant circuit.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A circuit comprising:
a power factor correction stage comprising:
an input;
an output;
a first switching path comprising at least one electronic switch, the first switching path operable to selectively block current flow in both directions through the first switching path, the first switching path operable to selectively allow current flow in both directions through the first switching path;
a second switching path comprising two electronic switches and a first capacitor, each of the two electronic switches in the second switching path including an inherent diode, a combination of the first switching path and the second switching path connected in parallel with each other; and
a resonant circuit including a resonant capacitor, the resonant circuit coupling the parallel combination of the first switching path and the second switching path to the output.

2. The circuit as in claim 1, wherein the electronic switches of the second switching path are two parallel-connected RB-IGBT devices, the RB-IGBT devices being oriented in parallel with one another, but in opposite directions.

3. The circuit as in claim 1, wherein the two electronic switches of the second switching path are two series-connected electronic switches.

4. The circuit as in claim 3, wherein the two electronic switches of the second switching path are two MOSFET devices oriented in series with one another but disposed in opposite directions.

5. The circuit as in claim 4, wherein the first switching path comprises two n-channel MOSFET devices that are connected in series and whose drain connections are interconnected.

6. A circuit comprising:
a first switching path comprising at least one electronic switch, the first switching path operable to selectively block current flow in both directions through the first switching path, the first switching path operable to selectively allow current flow in both directions through the first switching path; and
a second switching path comprising two electronic switches and a capacitor, each of the two electronic switches in the second switching path including an inherent diode;
wherein the two electronic switches of the second switching path are two series-connected electronic switches, each of the two electronic switches including an inherent diode;
wherein the two electronic switches of the second switching path are two MOSFET devices oriented in series with one another but disposed in opposite directions;
wherein the second switching path comprises a series circuit, the series circuit comprising a combination of a first n-channel MOSFET device, the capacitor, and a second n-channel MOSFET device, the capacitor being arranged between the drain connections of the first n-channel MOSFET device and the second n-channel MOSFET device; and
wherein the second switching path is arranged in parallel with the first switching path.

7. The circuit as in claim 4, wherein the first switching path has a series circuit comprising two switch circuits;
wherein the electronic switch circuits of the second switching path are connected in series; and
wherein a first center tap of the switch circuits of the first switching path is connected to a second center tap of the electronic switches of the second switching path.

8. The circuit as in claim 7,
wherein the second switching path comprises the first capacitor connected in series with a first p-channel MOSFET device;
wherein the source connection of the first p-channel MOSFET device is connected to the second center tap and to the source connection of a second p-channel MOSFET;

wherein the drain connection of the second p-channel MOSFET is connected to a second capacitor.

9. The circuit as in claim 4, wherein the first switching path has a series circuit comprising two switch circuits;
wherein the electronic switches of the second switching path are connected in series; and
wherein the capacitance of the second switching path is arranged between a first center tap of the switch circuits of the first switching path and a second center tap of the electronic switches of the second switching path.

10. The circuit as in claim 9,
wherein the second switching path comprises a series circuit comprising a first n-channel MOSFET device and a second n-channel MOSFET device, which have their drain connections connected to the second center tap,
wherein the first capacitor of the second switching path is coupled between the second center tap and the first center tap.

11. The circuit as in claim 1 further comprising:
an input inductance that is arranged between the input of the circuit and the first switching path.

12. The circuit as in claim 11, in which the resonant capacitor is a first resonant capacitor, the circuit further including a second resonant capacitor;
wherein the second resonant capacitor is connected in series with the input inductance and a primary winding of a transformer; and
wherein the first resonant capacitor is connected to a secondary winding of the transformer.

13. The circuit as in claim 12,
wherein the second resonant capacitor is connected in series to a load via a second diode, the cathode of the second diode pointing in the direction of the load; and
wherein a first diode is provided whose cathode is connected to the anode of the second diode and whose anode is connected to ground.

14. The circuit as in claim 1,
wherein the resonant capacitor is selectably connected to a load via a third electronic switch, a node coupling the resonant capacitor to the third switch;
wherein a fourth electronic switch is switchable between the node and ground.

15. The circuit as in claim 1, wherein a switching frequency at which at least one of the electronic switches of the first switching path is controlled is higher than a resonant frequency of the resonant circuit.

16. The circuit as in claim 1, wherein the second switching path comprises a commutation circuit, wherein the commutation circuit is set up such that, after one of the electronic switches of the first switching path is switched off, a current flows via a diode path of one of the electronic switches and the first capacitor of the second switching path.

17. The circuit as in claim 1, wherein at least one of the electronic switches of the first switching path and the electronic switch of the second switching path to provide zero voltage switching.

18. The circuit as in claim 1, wherein the electronic switches are actuated by a closed-loop control circuit.

19. The circuit as in claim 1, wherein the circuit provides power factor correction.

20. A method for operating a power factor correction stage circuit including a first switching path and a second switching path connected in parallel, the method comprising:
controlling the first switching path, the first switching path comprising at least one electronic switch, the first switching path operable to selectively block current flow in both directions through the first switching path, the first switching path operable to selectively allow current flow in both directions through the first switching path;
controlling the second switching path, the second switching path comprising two electronic switches and a first capacitor, each of the two electronic switches in the second path including an inherent diode; and
controlling activation of the electronic switches of the first switching path and the electronic switches of the second switching path such that after one of the electronic switches of the first switching path is switched off, a current flows via a diode path of one of the electronic switches of the second switching path and through the first capacitor of the second switching path.

21. The method as in claim 20, further comprising: during a switched-off period for one of the electronic switches of the first switching path, discharging the capacitance of the second switching path via an electronic switch of the second switching path.

22. The method as in claim 21,
wherein the circuit further comprises:
an input inductance that is arranged between an input of the circuit and the first switching path;
a resonant circuit comprising a resonant inductance and a resonant capacitance, the resonant circuit being arranged between the first switching path and an output of the circuit;
the method further comprising: controlling a switching frequency at which at least one of the electronic switches of the first switching path is operated to be higher than a resonant frequency of the resonant circuit.

23. The circuit as in claim 1, wherein the resonant circuit includes a resonant inductor connected in series with the resonant capacitor.

24. The circuit as in claim 1, wherein a differential output of the power factor correction stage is coupled to a transformer.

25. The circuit as in 24, wherein the input of the power factor correction stage is operable to receive a differential input voltage from an alternating voltage source.

26. The circuit as in claim 25 further comprising:
an input inductor coupling a first node of the alternating voltage source to a first node of the parallel combination of the first switching path and the second switching path.

27. The circuit as in claim 26, wherein a second node of the alternating voltage source is coupled to a second node of the parallel combination of the first switching path and the second switching path.

28. The circuit as in claim 1 further comprising:
an alternating voltage source;
an input inductor component, a combination of the alternating voltage source and the input inductor connected in series; and
wherein the series combination of the alternating voltage source and the input inductor component are connected in parallel with the parallel combination of the first switching path and the second switching path.

29. The circuit as in claim 1, wherein the first switching path includes a series circuit comprising two switch circuits;
wherein the electronic switch circuits of the second switching path are connected in series; and
wherein a center tap of the two switch circuits of the first switching path is connected to a center tap of the electronic switch circuits of the second switching path.

30. The circuit as in claim 1, wherein the second switching path comprises a first capacitor connected in series with a first p-channel MOSFET device;
wherein a source node of the first p-channel MOSFET device is connected to a source node of a second p-channel MOSFET; and
wherein a drain node of the second p-channel MOSFET is connected to a second capacitor.

31. The circuit as in claim 1, wherein the first switching path includes two switch circuits;
wherein the two electronic switches of the second switching path are connected in series; and
wherein a second capacitor is coupled between a center tap of the two switch circuits of the first switching path and a center tap of the two electronic switches of the second switching path.

32. The circuit as in claim 1, wherein the resonant circuit further includes a resonant inductor coupled in series with the resonant capacitor.

33. The circuit as in claim 32, wherein the resonant circuit couples the combination of the first switching path and the second switching path to a winding of a transformer.

34. The circuit as in claim 33, wherein the winding is a primary winding of the transformer; and
wherein a secondary winding of the transformer produces an output voltage to power a load based on energy received from the primary winding.

35. The circuit as in claim 1, wherein the first capacitor in the second switching path is coupled in series with the two electronic switches in the second switching path.

36. The method as in claim 20, wherein the first switching path includes a series circuit comprising two switch circuits;
wherein the electronic switch circuits of the second switching path are connected in series; and
wherein a center tap of the two switch circuits of the first switching path is connected to a center tap of the electronic switch circuits of the second switching path.

37. The method as in claim 20, wherein the first switching path includes two switch circuits;
wherein the two electronic switches of the second switching path are connected in series; and
wherein a second capacitor is coupled between a center tap of the two switch circuits of the first switching path and a center tap of the two electronic switches of the second switching path.

38. The method as in claim 20, wherein the first capacitor in the second switching path is coupled in series with the two electronic switches in the second switching path.

39. The circuit as in claim 1 further comprising:
a power supply circuit coupled to the power factor correction stage; and
a controller, the controller operable to generate control signals that control states of the at least one electronic switch in the first switching path and the two electronic switches in the second switching path, the controller controlling the states based on a magnitude of an output voltage produced by the power supply circuit coupled to the power factor correction stage.

40. The circuit as in claim 39, wherein the input receives an AC input voltage; and
wherein the output voltage of the power supply output stage is a DC voltage.

41. The circuit as in claim 1 further comprising:
a transformer, a primary winding of the transformer coupled to receive a voltage signal outputted from the output of the power factor correction stage; and
a power supply output stage, the power supply output stage coupled to a secondary winding of the transformer, the power supply output stage operable to produce an output voltage.

42. The circuit as in claim 41, wherein the resonant capacitor is a first resonant capacitor, the first resonant capacitor connected in series with the primary winding of the transformer, the circuit further comprising:
a second resonant capacitor, the second resonant capacitor connected in series with the secondary winding of the transformer.

43. The circuit as in claim 1, wherein the first switching path is a series circuit comprising two switch circuits, the two switch circuits of the first switching path being connected in series; and
wherein a first center tap of the two switch circuits of the first switching path is connected to a second center tap of the two electronic switches in the second switching path.

44. The circuit as in claim 43 further comprising:
a second capacitor disposed between the first center tap and the second center tap.

45. The circuit of claim 23, wherein both the first switching path and the second switching path are coupled to a node connecting the resonant inductor and the resonant capacitor.

46. The circuit as in claim 45, wherein the resonant circuit including the resonant capacitor and the resonant inductor is coupled in series with a winding of a transformer at the output.

47. The circuit as in claim 1 further comprising:
a resonant inductor connected in series with the resonant capacitor between the input and the output;
wherein a first end of the first switching path is coupled to a first node coupling the resonant inductor and the resonant capacitor; and
wherein a first end of the second switching path is coupled to the first node coupling the resonant inductor and the resonant capacitor.

48. The circuit as in claim 47, wherein a second end of the first switching path and a second end of the second switching path is coupled to a second node.

49. The circuit as in claim 48, wherein the resonant capacitor is connected in series with a winding of a transformer between the first node and the second node.

50. The circuit as in claim 49, wherein the input includes a voltage source coupled to the resonant inductor and the second node.

* * * * *